United States Patent
Ohta et al.

(10) Patent No.: US 7,626,294 B2
(45) Date of Patent: Dec. 1, 2009

(54) FEEDER LINE AND TERMINAL CONNECTION STRUCTURE IN STATOR, AND JOINING DEVICE

(75) Inventors: Minoru Ohta, Shioya-gun (JP); Makoto Kawakami, Niza (JP)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 11/548,010

(22) Filed: Oct. 10, 2006

(65) Prior Publication Data
US 2007/0080592 A1 Apr. 12, 2007

(30) Foreign Application Priority Data
Oct. 12, 2005 (JP) ............................... 2005-297342

(51) Int. Cl.
*H02K 11/00* (2006.01)
(52) U.S. Cl. ......................................... 310/71; 310/194
(58) Field of Classification Search ................... 310/71, 310/194, 268, 260
See application file for complete search history.

(56) References Cited
U.S. PATENT DOCUMENTS

| | | | |
|---|---|---|---|
| 7,034,419 B2* | 4/2006 | Kabasawa et al. | 310/71 |
| 7,476,995 B2* | 1/2009 | Uchiyama et al. | 310/71 |
| 2004/0251752 A1* | 12/2004 | Shinzaki et al. | 310/71 |
| 2006/0033395 A1* | 2/2006 | Izumi et al. | 310/208 |
| 2007/0262664 A1* | 11/2007 | Niehaus et al. | 310/71 |
| 2008/0122301 A1* | 5/2008 | Okada et al. | 310/43 |

FOREIGN PATENT DOCUMENTS

JP 2004-96841 A 3/2004

* cited by examiner

*Primary Examiner*—Quyen Leung
*Assistant Examiner*—Leda Pham
(74) *Attorney, Agent, or Firm*—Westerman, Hattori, Daniels & Adrian, LLP

(57) ABSTRACT

In this feeder line and terminal connection structure, each of feeder lines is positioned shifted in an axial direction of a stator for each phase, and includes a terminal portion extending in a radial direction of a stator; the terminals include a first connection portion, connected to one end of a stator coil, and a second connection portion, connectable to the terminal portions of the feeder lines for any phase; the second connection portion has a base portion, of length in the axial direction enabling connection to the terminal portion of the feeder lines for any phase, and a plurality of partition walls protruding from the base portion in a circumferential direction of the stator; and the terminal portions of the feeder lines for each phase are joined with one pair of the partition walls, in mutual opposition, and with the base portion.

6 Claims, 22 Drawing Sheets

FEEDER LINE AND TERMINAL CONNECTION STRUCTURE IN STATOR, AND JOINING DEVICE

BACKGROUND OF THE INVENTION

Priority is claimed on Japanese Patent Application No. 2005-297342, filed Oct. 12, 2005, the contents of which are incorporated herein by reference.

FIELD OF INVENTION

The present invention relates to a feeder line and a terminal connection structure in a stator, and a joining device suitable for forming this connection structure.

DESCRIPTION OF THE RELATED ART

Stators of an electric motor or similar are known in which; a stator coil is wound around an insulating bobbin which is fitted around a split core to form a stator piece; a plurality of such stator pieces are prepared and arranged in a ring shape to configure a ring-shaped stator group; a ring-shaped distribution member is mounted on this ring-shaped stator group; terminal portions of the feeder lines (bus rings) for each phase in the distribution member are connected to the ends of stator coils, via terminals fixed onto the insulating bobbin; and the other ends of the stator coils of adjacent stator pieces are connected via midpoint terminals fixed to the insulating bobbin (see for example Japanese Unexamined Patent Application, First Publication No. 2004-96841).

However, in such a stator of the prior art, the feeder lines of the distribution member are shifted in position in the stator axial direction for each phase; therefore, in order to connect the terminal portions of feeder lines with connectors, either the dimensions or shapes of the terminal portions must be changed for each phase, or the connector dimensions or shape must be changed for each phase. In either case, numerous types of members must be prepared.

Hence, the present invention has an object of providing a stator which enables use of common components, and thereby improving productivity.

SUMMARY OF THE INVENTION

In order to achieve the above object, the present invention employed the followings.

A connection structure of feeder lines and terminals in a stator of the present invention is a connection structure of feeder lines and terminals in a stator, in which: a stator coil is wound about an insulating bobbin fitted around a core to configure a stator piece; a plurality of the stator pieces are arranged in a ring shape to configure a ring-shaped stator group; a ring-shaped distribution member is mounted on the ring-shaped stator group; and the feeder lines for each phase of the distribution member and the stator coils are connected via terminals fixed on the insulating bobbins, wherein each of the feeder lines is positioned shifted in the axial direction of the stator for each phase, and includes a terminal portion extending in the radial direction of the stator; the terminals include a first connection portion, connected to one end of the stator coil, and a second connection portion, connectable to the terminal portions of the feeder lines for any phase; the second connection portion has a base portion, of length in the axial direction enabling connection to the terminal portion of the feeder lines for any phase, and a plurality of partition walls protruding from the base portion in the circumferential direction of the stator; and the terminal portions of the feeder lines for each phase are joined with one pair of the partition walls, in mutual opposition, and with the base portion.

According to the connection structure of feeder lines and terminals in a stator, the terminal portions of any phase of the distribution member, positioned shifted in the axial direction of the stator, can be connected to the second connection portion of the terminal (the terminal in the stator piece of any phase can be the same); therefore, common use of the terminals becomes possible.

Moreover, the terminal portions of feeder lines for any phase are joined at three places, which are the pair of partition walls in mutual opposition and the base portion in the second connection portion; therefore, electrical resistance can be reduced, and tensile strength can be increased.

The terminal portions of the feeder lines for each phase and the second connection portions may be joined by hot crimping.

In this case, the terminal portions on which an insulating film is formed are inserted between the pair of partition walls and the base portion of the second connection portion and hot crimping is performed, to strip away the insulating film and simultaneously join the conducting wire of the terminal portion to the second connection portion. As a result, there is no need to strip away the insulating film in advance before the joining operation.

Further, a joining device of the present invention is a joining device, in which a stator coil is wound about an insulating bobbin fitted around a core to configure a stator piece; a plurality of the stator pieces are arranged in a ring shape to configure a ring-shaped stator group; a ring-shaped distribution member is mounted on the ring-shaped stator group; the feeder lines for each of the phases of the distribution member and the stator coils are connected via terminals fixed on the insulating bobbins; each of the feeder lines is positioned shifted in the axial direction of the stator for each phase; and includes a terminal portion extending in the radial direction of the stator, the terminals include a first connection portion connected to one end of the stator coil and a second connection portion connectable to the terminal portions of the feeder lines for any phase; the second connection portion has a base portion of length in the axial direction enabling connection to the terminal portion of the feeder lines for any phase and a plurality of partition walls protruding from the base portion in the circumferential direction of the stator; and the terminal portions of the feeder lines for each phase join the feeder lines of the stator, joined to one pair of the partition walls in mutual opposition and to the base portion, to the terminals, wherein the joining device includes: a first electrode, abutting a rear face of the base portion of the second connection portion on a side opposite side on which the partition walls are provided; and, a second electrode, abutting both tips of the pair of opposing partition walls encompassing the terminal portion of the feeder line, and the abutting face of which is formed into a concave shape which gradually becomes concave in a direction of protrusion of the partition walls, wherein by encompassing the terminal portion of the feeder line, and the base portion and the pair of partition walls, which surround the terminal portion on three sides, with the first electrode and the second electrode, hot crimping is performed, to join the feeder line and the terminal.

According to the joining device, the abutting face of the second electrode is formed in a concave shape which gradually becomes concave in the direction of protrusion of the partition walls; therefore, when the first electrode and the second electrode encompass the terminal portion of the feeder line and the base portion and the pair of partition walls which surround the terminal portion on three sides, through the action of the abutting face of the second electrode, a force acts on the pair of partition walls to cause the tips thereof to approach each other, so that the pair of partition walls are caused to be pressure-welded to the terminal portion.

Further, when performing hot crimping by encompassing the terminal portion of the feeder line and the second connection portion, which surrounds the terminal portion of the feeder line on three sides, with the first electrode and the second electrode, a current can be passed from the first electrode to the second electrode via the second connection portion to heat the second connection portion; and by means of this heat, the insulating film of the terminal portion can be melted. At this time, the region through which current flows in the terminal can be restricted to the vicinity of the terminal portion. As a result, the region in the terminal in which heat is generated can be restricted to the vicinity of the terminal portion. By this, the insulating film of the terminal portion can be melted in a short time; therefore, productivity thereof can be improved.

In the above hot crimping, by continuing the passage of current even after the insulating film has been melted, current is passed from the first electrode to the second electrode via the second connection portion and the conducting wire of the terminal portion, so that tin plated on the conducting wire is diffused at the contact face between the conducting wire and the second connection portion, and the two are diffusion-bonded. As a result, the terminal portion of the feeder line can easily be joined to the three locations which are the pair of partition walls and the base portion.

The first electrode may have a convex portion which abuts only a center vicinity of the base portion of the second connection portion.

In this case, the center vicinity of the base portion can be heated, and the melted insulating film can easily be moved to the outside. Hence, foreign matter can be prevented from remaining in the joined portion, and the joining strength can be increased.

The abutting face of the first electrode and the abutting face of the second electrode may be coated with a conductive member having a melting point equal to or above a predetermined temperature.

In this case, when hot crimping is performed, the first electrode and the second electrode can be kept from readily adhering to the second connection portion of the terminal.

DETAILED DESCRIPTION OF THE INVENTION

Embodiments of a stator of the present invention are explained below, referring to FIGS. 1 to 30.

Figure 1:
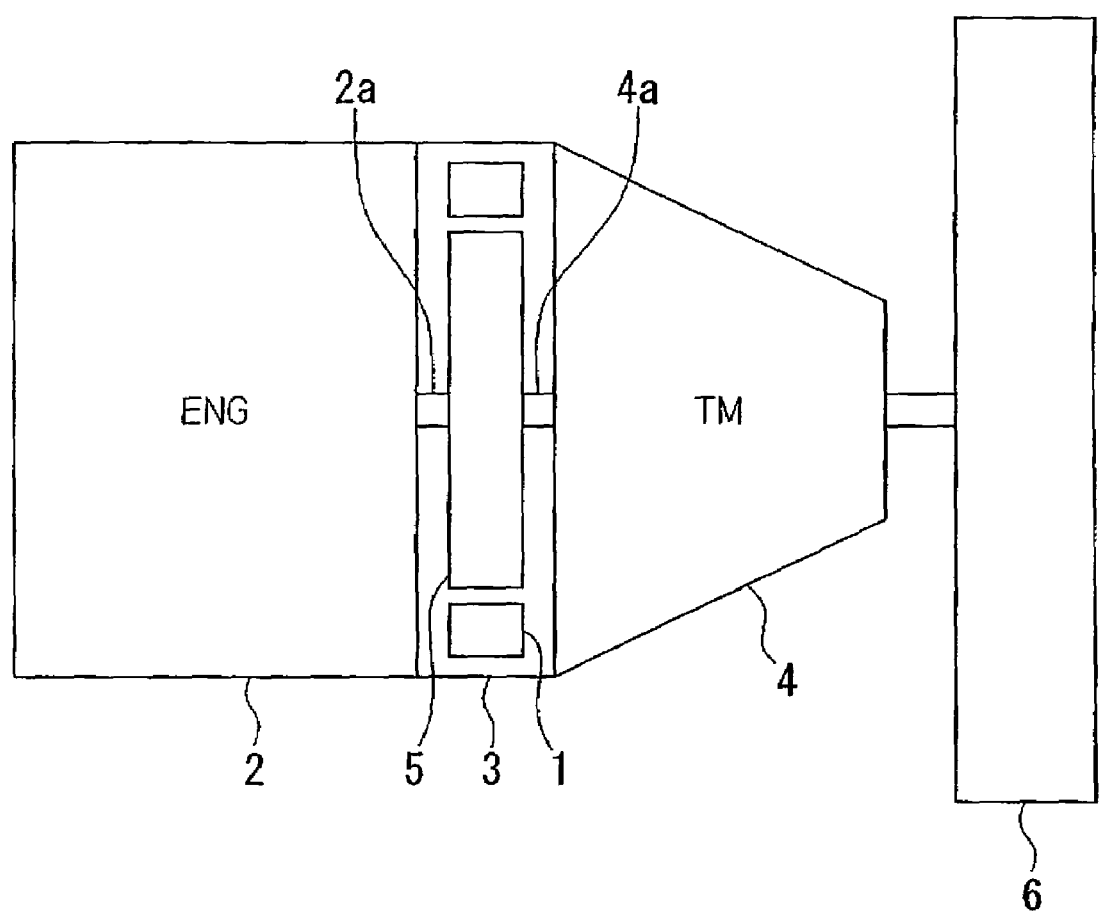
FIG. 1 is a schematic diagram of a driving system of a hybrid vehicle provided with, as one of driving sources, an electric motor including a stator of the present invention.

The stator of the present embodiment is used in the driving electric motor of a hybrid vehicle. FIG. 1 is a schematic diagram of the driving system of a hybrid vehicle. A hybrid vehicle includes, as drive sources, an internal combustion engine (an engine) 2, and an electric motor (a rotary motor) 3. In the electric motor 3, an output shaft 2a of the internal combustion engine 2 and an input shaft 4a of a transmission 4 are linked to a rotor 5 which rotates in the stator 1. The driving forces of the internal combustion engine 2 and of the electric motor 3 are transmitted to the drive wheels (vehicle wheels) 6 via the transmission 4, and the hybrid vehicle travels under the driving force of at least one of the internal combustion engine 2 and the electric motor 3. Further, when a driving force is transmitted from the driving wheels 6 to the electric motor 3 during deceleration of the hybrid vehicle, the electric motor 3 functions as an electric generator, and recovers the kinetic energy of the vehicle as electrical energy in an accumulation device (not shown) by means of regenerative braking.

Figure 2:
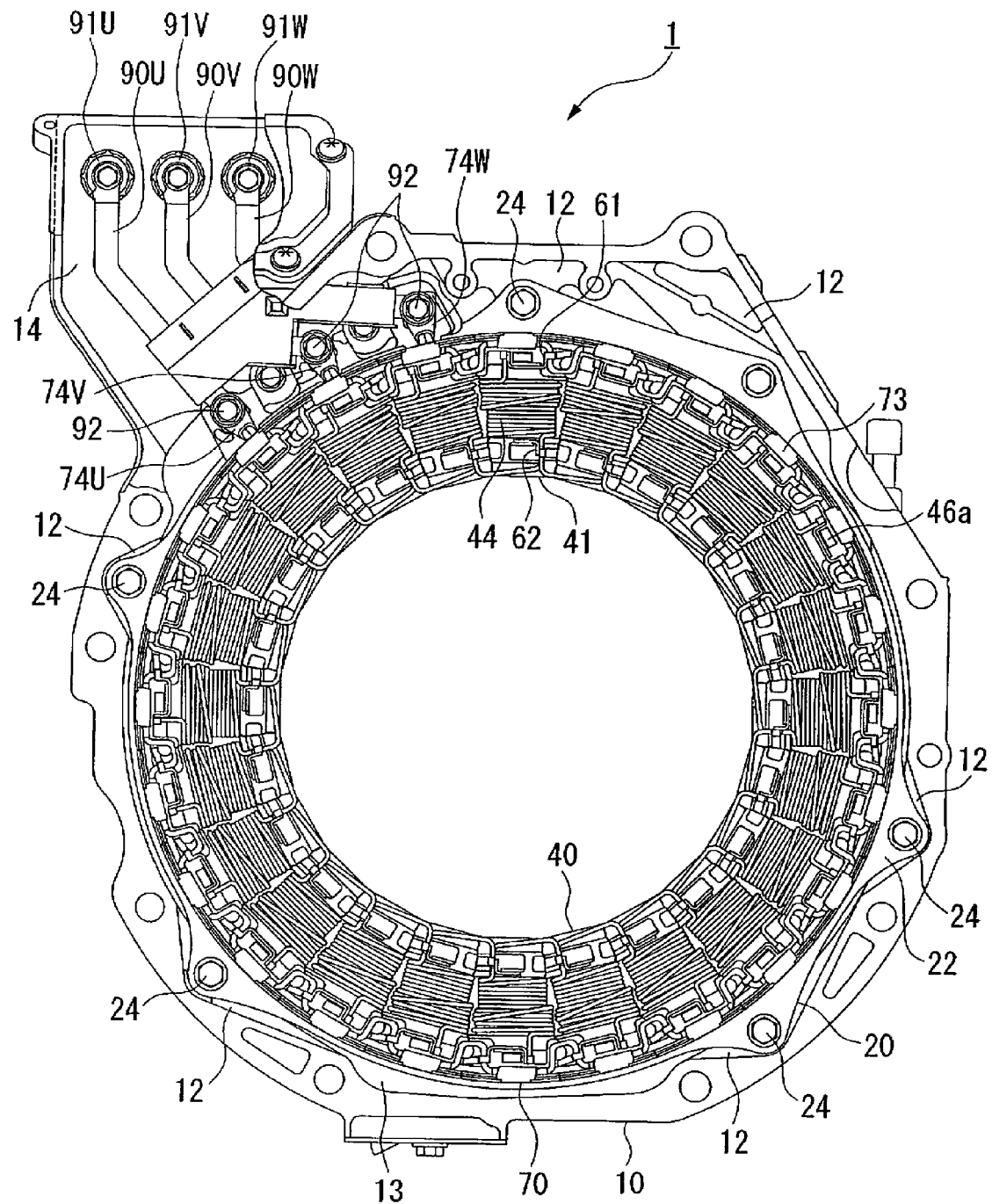
FIG. 2 is a front view showing one embodiment of a stator of the present invention.
Figure 3:
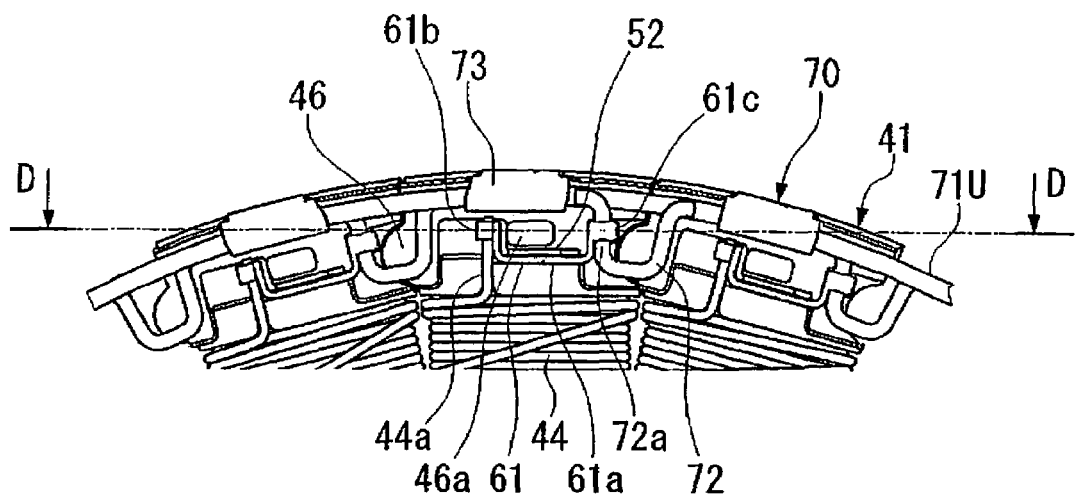
FIG. 3 is an enlarged front view of principal portions of the stator.
Figure 4:
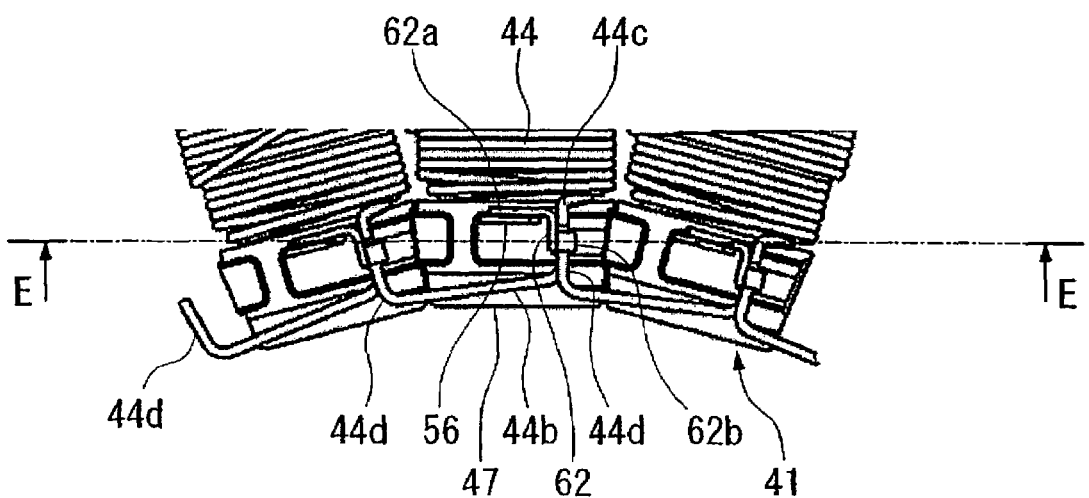
FIG. 4 is an enlarged front view of principal portions of the stator.
Figure 5:
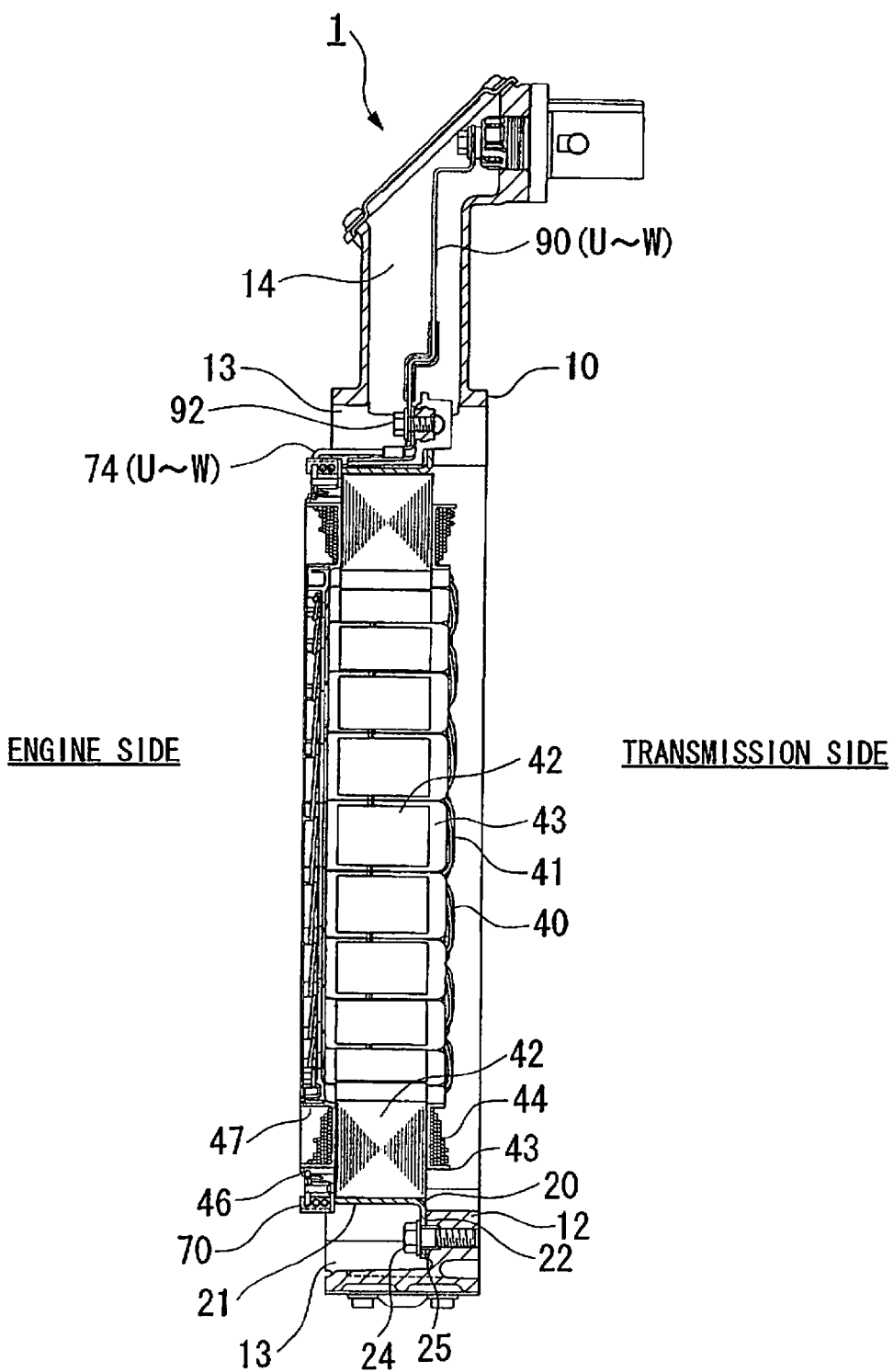
FIG. 5 is a vertical cross-sectional view of the stator.
Figure 6:
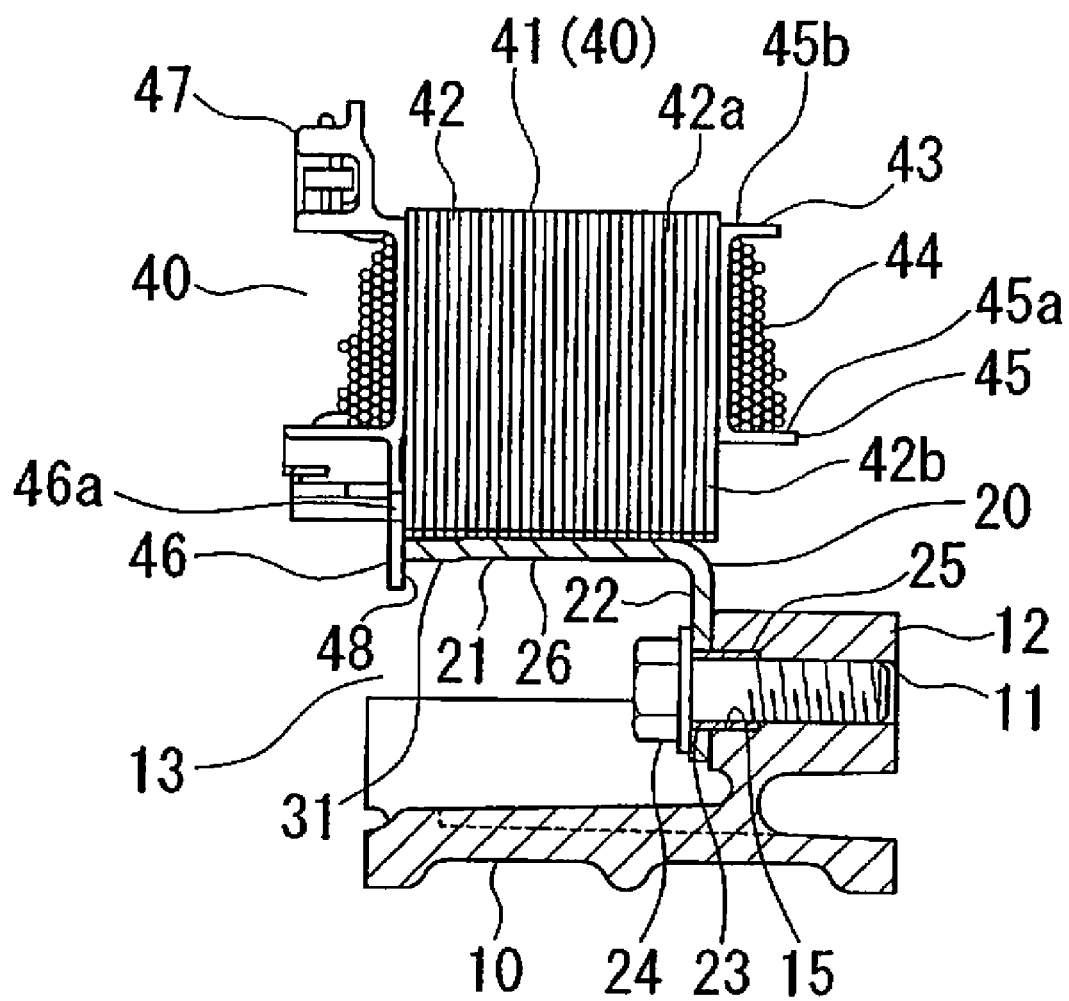
FIG. 6 is an enlarged cross-sectional view of principal portions of the stator.

FIG. 2 is a front view of the stator 1 seen from the side of the internal combustion engine 2. FIG. 3 and FIG. 4 are enlarged front views of principal portions of the stator. FIG. 5 is a vertical cross-sectional view of principal portions of the stator 1. FIG. 6 is an enlarged cross-sectional view of principal portions of the stator 1. The stator 1 includes a housing 10, a stator holder 20, a ring-shaped stator group 40 in which stator pieces 41 are arranged in a ring shape, and a ring-shaped distribution member 70.

The housing 10 forms the housing of a electric motor 3, and is encompassed between the internal combustion engine 2 and transmission 4 and interconnected and fixed therebetween.

An interior space 13 of the housing 10 is formed into a shape enabling accommodation of the stator holder 20 and the ring-shaped stator group 40. On the side of interconnection with the transmission 4 of the interior periphery of the interior space 13, a plurality of (in the present embodiment, six) bosses (fixing portions) 12 having bolt holes 11 to fix the stator holder 20 are provided in predetermined circumferential positions. In addition, the housing 10 includes a terminal box 14 connected to the interior space 13.

Figure 7:
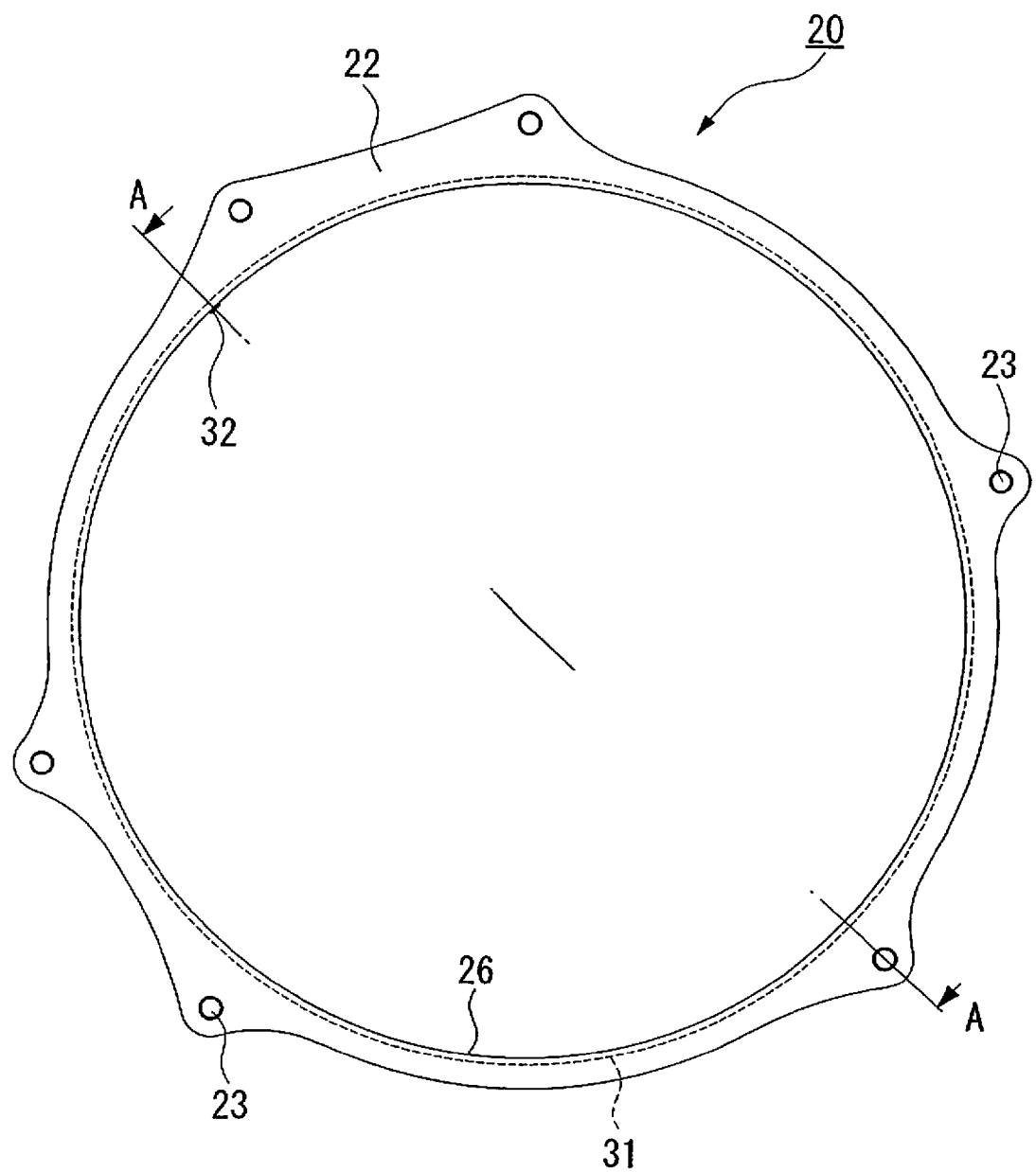
FIG. 7 is a front view seen from a flange side of a stator holder used in the stator.
Figure 8:
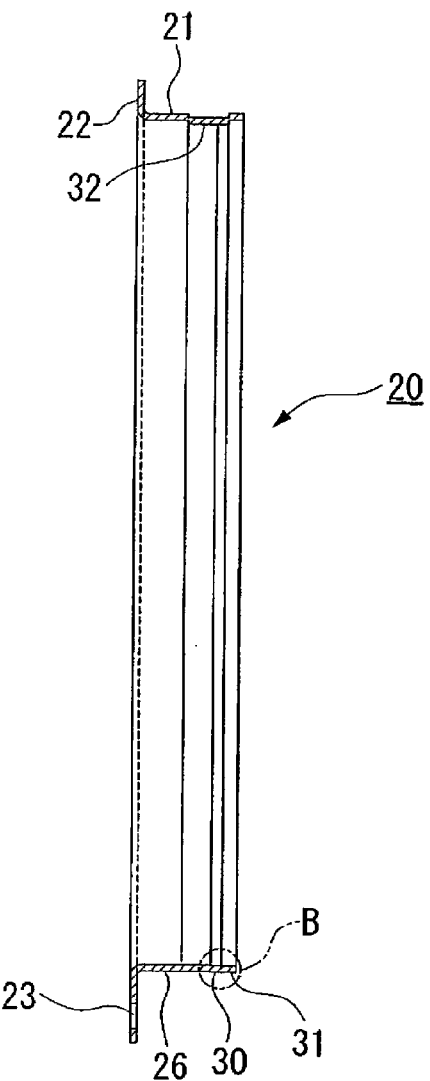
FIG. 8 is a cross-sectional view along A-A in FIG. 7, showing the stator holder.

As shown in FIG. 7 and FIG. 8, the stator holder 20 includes a cylinder portion 21, and a flange portion 22 provided so as to protrude on the outer side in the radial direction on one end in the axial direction. The flange portion 22 is provided with penetrating holes 23, in positions corresponding to the bolt holes 11 in the housing 10. The stator holder 20 is accommodated within the housing 10 with the flange portion 22 facing the side of the transmission 4 and with the cylinder portion 21 facing the side of the internal combustion engine 2. This stator holder 20 is fixed to the housing 20 by aligning the flange portion 22 with the end faces of the bosses 12 on the side of the internal combustion engine 2 (on the inside in the axial direction), and screwing bolts 24, which are passed through the penetrating holes 23, into the bolt holes 11.

Two of the six bolts 24 which fix the stator holder 20 to the housing 10 are passed through a cylinder-shaped knock pipe 25, as shown in FIG. 6. The penetrating holes 23 corresponding to the bolts 24 which are passed through knock pipes 25 are formed to a size enabling insertion of the knock pipe 25, and knock holes 15 enabling insertion of the knock pipe 25 are formed in the corresponding bolt holes 11.

Figure 9:
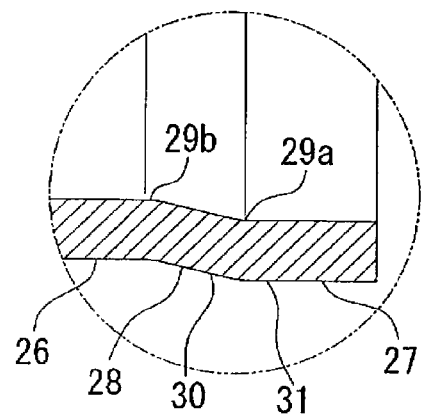
FIG. 9 is an enlarged cross-sectional view of portion B in FIG. 8, showing the stator holder.

As shown in FIG. 9, the cylinder portion 21 of the stator holder 20 is formed with a straight small-diameter cylinder portion (an insertion cylinder portion) 26 on the side of the flange portion 22, and a straight large-diameter cylinder portion 27 on the side in the axial direction opposite the flange portion 22. The small-diameter cylinder portion 26 and the large-diameter cylinder portion 27 are connected by a tapered cylinder portion 28. The large-diameter cylinder portion 27 and the tapered cylinder portion 28, and the tapered cylinder portion 28 and the small-diameter cylinder portion 26, are both connected smoothly by arc-shaped faces 29a and 29b. An inner diameter of the large-diameter cylinder portion 27 is set larger than an outer diameter of a yoke 42b of a split core 42, described below. An inner diameter of the small-diameter cylinder portion 26 is set somewhat smaller than the outer diameter of the yoke 42b, to a degree enabling press-fitting of the yoke 42b.

In the present embodiment, the tapered cylinder portion 28 and the arc-shaped faces 29a and 29b form a contracting-diameter portion 30 such that the inner diameter of the stator holder 20 contracts continuously in the direction toward the end of one side (the side of the flange portion 22) in the axial direction, and the small-diameter cylinder portion 26 is connected on a small-diameter side of the arc-shaped face 29b. The large-diameter cylinder portion 27 and the contracting-diameter portion 30 form a guidance portion 31.

At the predetermined locations in the circumferential direction of the stator holder 20 are provided protruding ribs 32, extending in the axial direction from the tapered cylinder portion 28 to a portion of the large-diameter cylinder portion 27, and protruding on the inner side in the radial direction. These protruding ribs 32 are provided for positioning in the circumferential direction with respect to the ring-shaped stator group 40.

Figure 10:
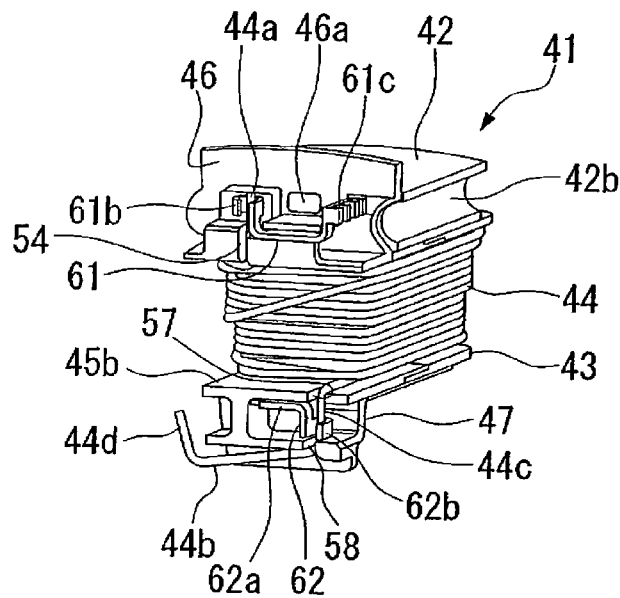
FIG. 10 is a perspective assembled view of a stator piece used in the stator.
Figure 11:
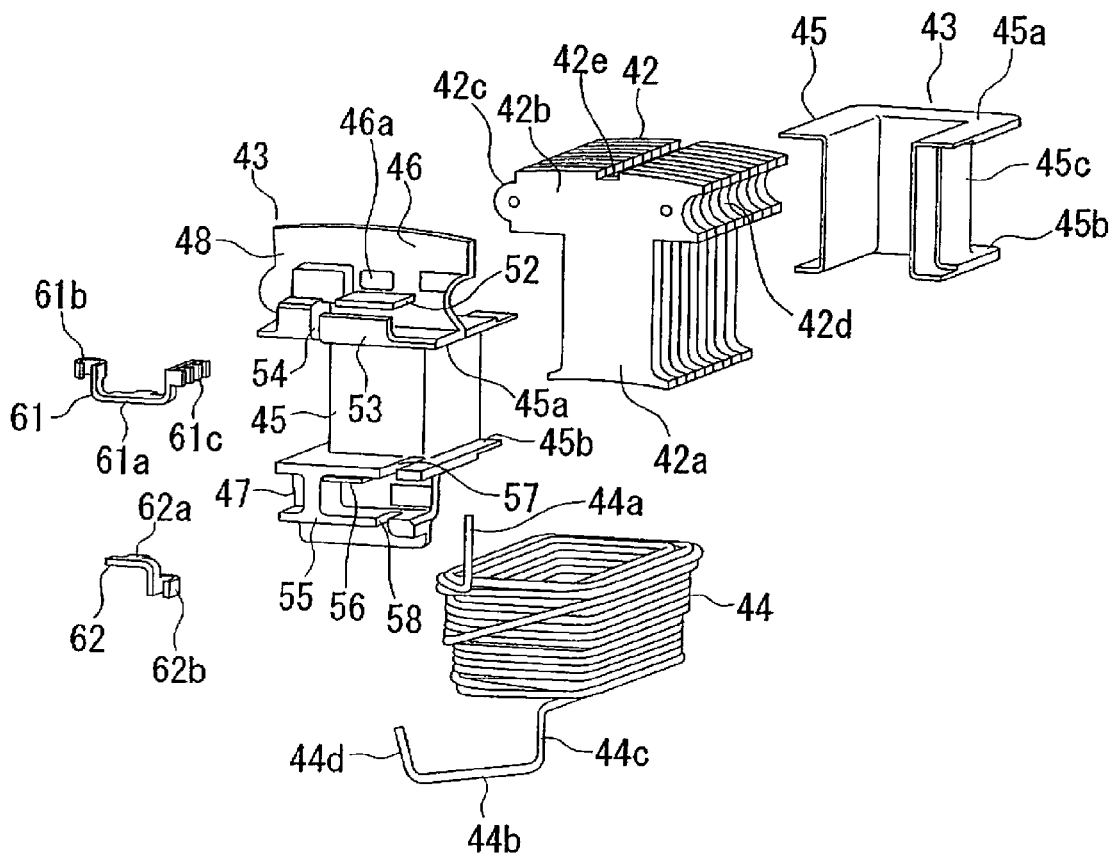
FIG. 11 is an exploded perspective view of the stator piece.

The ring-shaped stator group 40 is configured by arranging a predetermined number of stator pieces 41 in a ring shape. FIG. 10 is an assembly diagram of a stator piece 41. FIG. 11 is an exploded view of the same stator piece 41. The stator piece 41 includes a split core 42 formed by stacking silicon steel sheets punched substantially into a "T" shape; an insulating bobbin 43 of a resin material, fitted around the split core 42; and a stator coil 44 wound around the insulating bobbin 43.

The split core 42 includes teeth 42a and a yoke 42b. A convex portion 42c with substantially a semicircular shape is formed at one end in the circumferential direction of the yoke 42b, and a concave portion 42d with substantially a semicircular shape is formed at the other end. When the stator pieces 41 are arranged in a ring shape, the convex portions 42c of the yokes 42b fit into the concave portions 42d of the adjacent yokes 42b, so that all the yokes 42b are connected in a circular shape.

On an outer circumferential face of the yokes 42b are provided grooves 42e extending along the direction of stacking of the split cores 42. By inserting the protruding ribs 32 of the stator holder 20 into these grooves 42e, the circumferential-direction position of the ring-shaped stator group 40 can be positioned with respect to the stator holder 20.

As shown in FIG. 11, the insulating bobbin 43 is divided in two in the axial direction of the stator 1 (in the direction of stacking of the split core 42). In the following explanation, the insulating bobbin 43 is assumed to be a single integral member. The insulating bobbin 43 includes: a bobbin portion 45, which fits around the teeth of the split core 42; a distribution wall portion 46, protruding from the bobbin portion 45 on one side in the stacking direction of the split core 42, protruding on the side of the yoke 42b of the split core 42, and substantially forming in cross-section an inverted "L" shape covering substantially the entire end face of the yoke 42b; and a mid-point interconnection wall portion 47, on the side of the same end as the distribution wall portion 46, extending in the direction to move away from the yoke 42b.

Rim portions 45a and 45b are provided on both ends in the radial direction of the bobbin 45. The stator coil 44 is wound around a portion 45c between the rim portions 45a and 45b. The distribution wall portion 46 includes a side plate portion 48, positioned along the end face of the yoke 42b. On the side plate portion 48 is positioned the distribution member 70.

A hole 46a to expose a portion of the end face of the yoke 42b is opened substantially at a center of the side plate portion 48 of the distribution wall portion 46. Further, a bracket 52 is provided on the side plate portion 48, closer to the rim portion 45a than to the hole 46a. The tip of the arm 53 extending from the central tip of the rim portion 45a is positioned in proximity to the bracket 52. A notch groove 54, extending in the direction of stacking of the split core 42, is provided at a position on the rim portion 45a adjacent to the arm 53.

Figure 12:
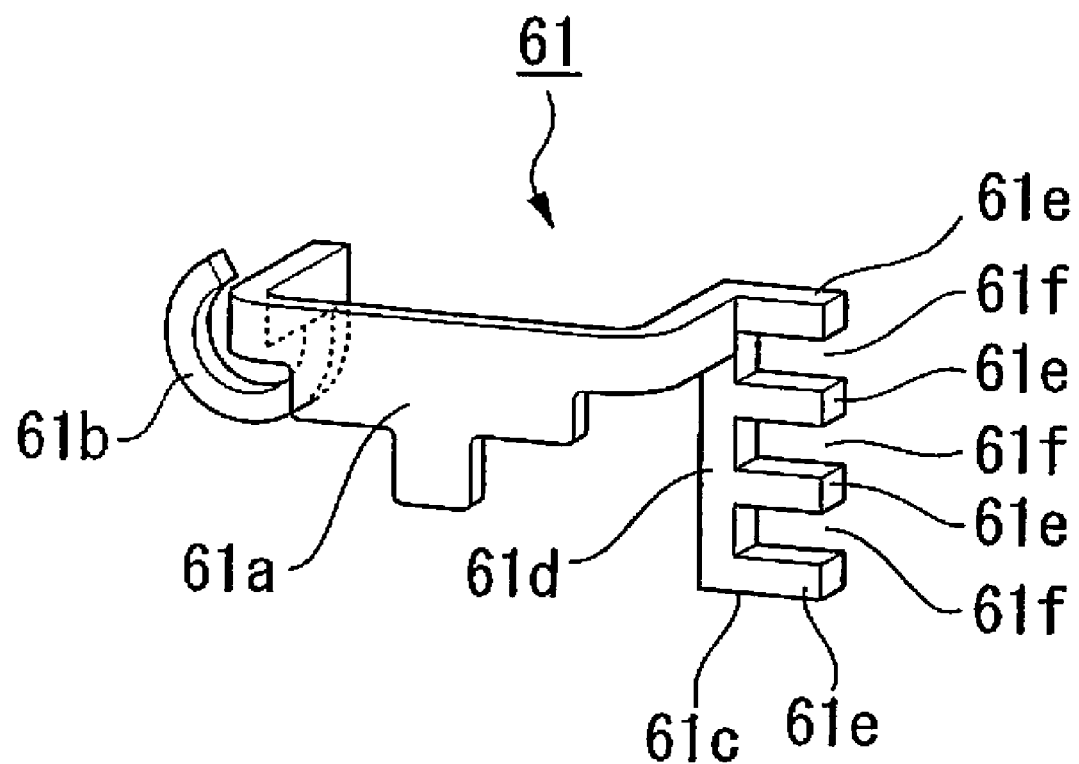
FIG. 12 is a perspective view of a terminal of the stator piece.

A terminal 61 is fixed between the bracket 52 and arm 53. As shown in FIG. 11 and FIG. 12, in the center of the terminal 61 is provided the support portion 61a, on one side of which is provided a first connection portion 61b forming an arc shape, while on the other side is provided a second connection portion 61c forming a combtooth shape. The second connection portion 61c includes a base arm (base portion) 61d, positioned along the axial direction of the stator 1 in the length direction, and four branch arms 61e provided at the predetermined intervals in the length direction of this base arm 61d, protruding from the base arm 61d in one circumferential direction of the stator 1 (the direction moving away from the first connection portion 61b). Between the adjacent branch arms 61e are formed terminal accommodation portions 61f, into which are inserted the terminal portions 72a of bus rings 71U, 71V, and 71W (hereinafter, when there is no particular need for differentiation, simply called "bus rings 71").

The support portion 61a is inserted between the bracket 52 and the arm 53 to fix the terminal 61 in place. The first connection portion 61b is positioned on the same side as the notch groove 54. One end 44a of the stator coil 44 is inserted through the notch groove 54 into the first connection portion 61b, and by crimping the first connection portion 61b, is connected to the first connection portion 61b (see FIG. 3, FIG. 10, FIG. 18 through FIG. 20). The distribution member 70 is connected to the second connection portion 61c; this will be explained later.

The midpoint interconnection wall portion 47 includes a partition plate portion 55 positioned substantially parallel to the rim portion 45b, and a bracket 56, provided more closely to the rim portion 45b than to the partition plate portion 55, and substantially parallel to the rim portion 45b. Notch grooves 57 and 58 extending in the direction of stacking of the split core 42 are provided at mutually corresponding positions.

A midpoint terminal 62 is fixed between the rim portion 45b and bracket 56. As shown in FIG. 11, a connection portion 62b, formed in a "U" shape, is provided at one end of the support portion 62a of the midpoint terminal 62. The terminal 62 is fixed by inserting the support portion 62a between the rim portion 45b and the bracket 56. The connection portion 62b is positioned on substantially a straight line with the notch grooves 57 and 58. And, (a) the base portion 44c of the other end 44b of the stator coil 44 is passed through the notch groove 57 of the rim portion 45b and inserted into the connection portion 62b of the terminal 62, (b) the tip portion 44d of the other end 44b of the stator coil 44 in the stator piece 41 which is positioned adjacently during assembly of the ring-shaped stator group 40 is passed through the notch groove 58 of the partition plate portion 55 and inserted into the same connection portion 62b, and (c) the connection portion 62b, with base portion 41c and tip portion 44d inserted, is crimped, and by doing these, the other ends 44b of the two adjacent stator coils 44 are connected to the connection portion 62b (see FIG. 4, FIG. 10 and FIG. 17). Hence, the other ends 44b of the stator coils 44 of the stator pieces 41 for all phases are connected via the midpoint terminals 62.

In this stator 1, by inserting the other ends 44b of two adjacent stator coils 44 into the connection portion 62b of the midpoint terminal 62, and then crimping the connection portion 62b, the two other ends 44b can be connected in a single crimping operation; therefore, productivity can be improved.

As shown in FIG. 6, with the ring-shaped stator group 40 mounted on the stator holder 20, the outer peripheral face of the yoke 42b of each stator piece 41 is fitted into the inner face of the small-diameter cylinder portion 26 of the stator holder 20, the end faces of the split cores 42 on one end in the stacking direction are substantially flush with the outer face of the flange portion 22, and the end faces on the other side in the stacking direction of the split cores 42 are substantially flush with the tip faces of the large-diameter cylinder portion 27. Further, the outer peripheral portions of the distribution wall portions 46 protrude to the outside in the radial direction from the large-diameter cylinder portion 27.

Next, the distribution member 70 positioned on the side plate portion 48 of the insulating bobbin 43 will be explained, referring to FIG. 13 through FIG. 16 and FIG. 30.

The distribution member 70 is configured with the bus rings (feeder lines) 71U, 71V, and 71W for the U, V, and W phases, formed in ring shapes of the same diameter, positioned concentrically and shifted in the axial direction; these three bus rings 71U, 71V, and 71W are bound together by a resin mold portion (a bonding member) 73. Connection portions 72, protruding in substantially a "U" shape on the inside in the radial direction, are provided on each of the bus rings 71U, 71V, and 71W at the predetermined intervals in the circumferential direction. The connection portions 72 for each phase are arranged in order so as not to overlap in the circumferential direction with the connection portions 72 of other phases.

Figure 15:
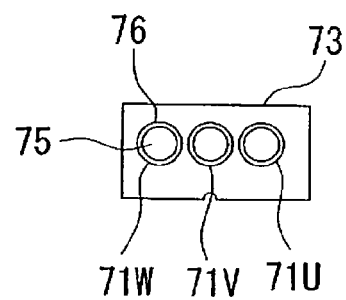
FIG. 15 is a cross-sectional view along C-C in FIG. 13, showing the distribution member.
Figure 16:
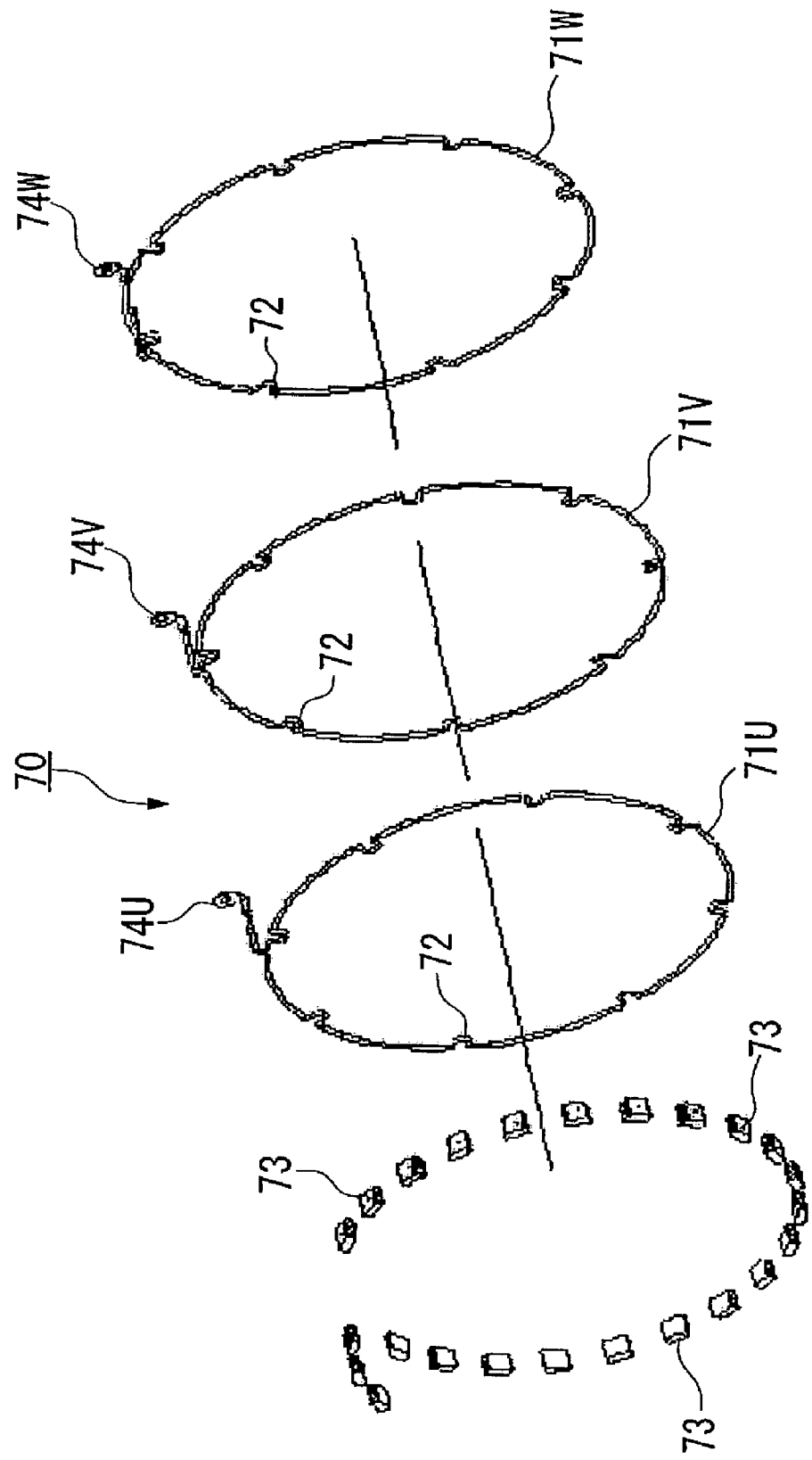
FIG. 16 is an exploded perspective view of the distribution member.
Figure 17:
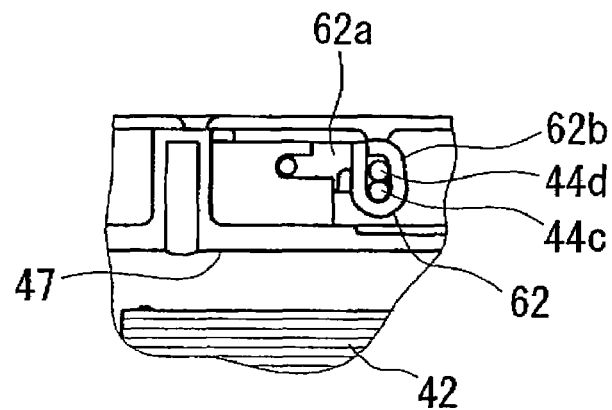
FIG. 17 is a cross-sectional view along E-E in FIG. 4, showing the stator.

As shown in FIG. 15, the bus rings 71U, 71V, and 71W are each configured as a conductive wire 75 covered with an insulating film 76. In the connection portions 72, the portions extending in the direction perpendicular to the bus ring 71 are terminal portions 72a.

Figure 13:
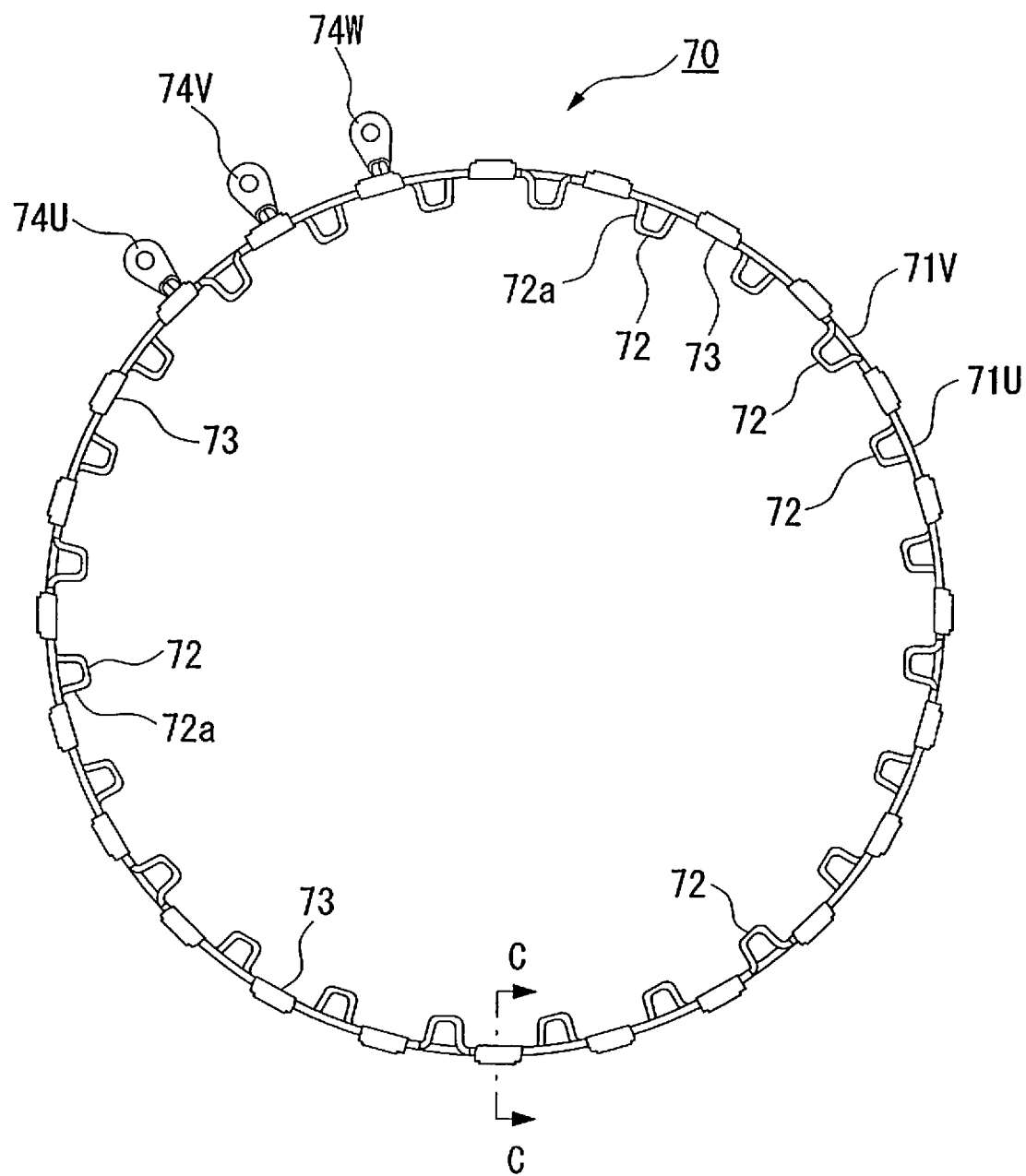
FIG. 13 is a front view of a distribution member used in the stator.
Figure 14:
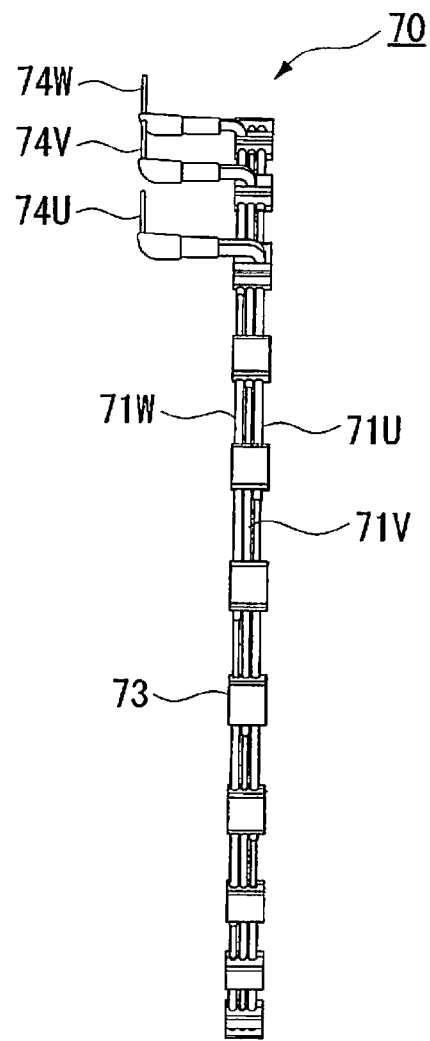
FIG. 14 is a side view of the distribution member.

As shown in FIG. 13 and FIG. 14, resin mold portions 73 are provided between neighboring connection portions 72 in the circumferential direction, regardless of the three phases. And, as shown in FIG. 3, the terminal portions 72a of the connection portions 72 on the bus rings 71U, 71V, and 71W are hooked to the second connection portions 61c of the terminals 61 in the corresponding stator pieces 41.

The connection portions 72 of the bus rings 71U, 71V, and 71W are shifted in the axial direction for each phase; however, the base arms 61d of the second connection portions 61c in the terminals 61 have length in the axial direction sufficient to enable connection to the terminal portions 72a of connection portions 72 at any position in the axial direction. Moreover, the terminal portions 72a for each phase can be inserted into any of the terminal accommodation portions 61f of the second connection portions 61c. That is, the terminals 61 are components which are common to each of the phases U, V and W.

Figure 18:
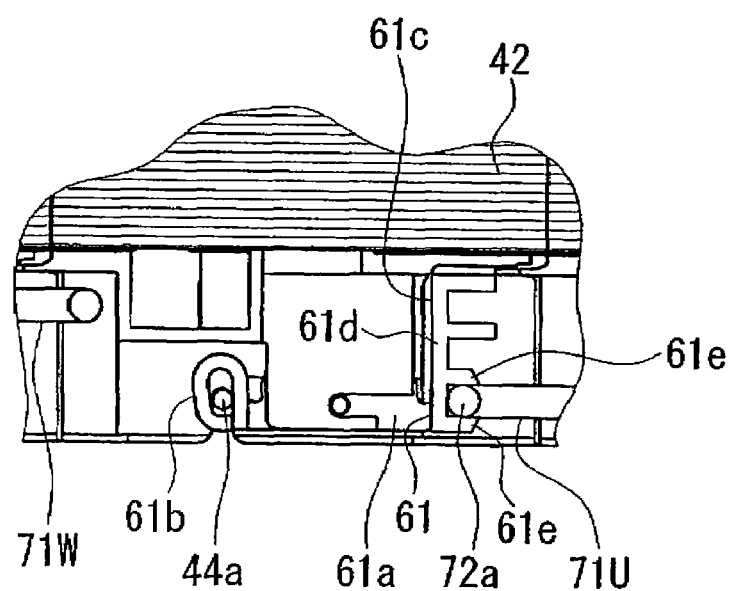
FIG. 18 is a cross-sectional view along D-D in FIG. 3, showing a bus ring-terminal connection member for the U phase of the distribution member.
Figure 19:
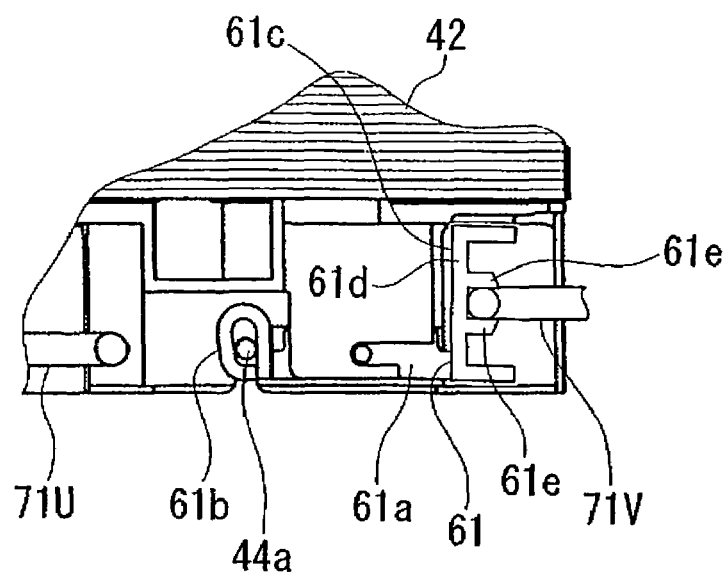
FIG. 19 is a cross-sectional view along D-D in FIG. 3, showing a bus ring-terminal connection member for the V phase of the distribution member.
Figure 20:
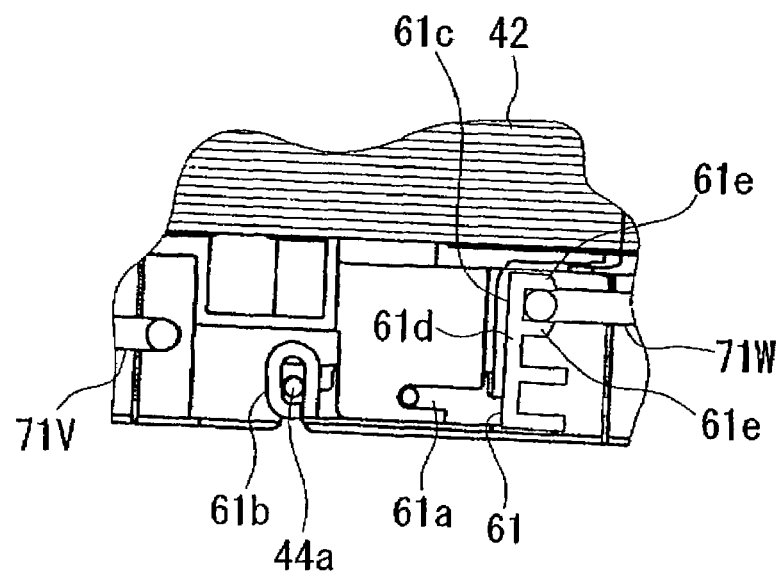
FIG. 20 is a cross-sectional view along D-D in FIG. 3, showing a bus ring-terminal connection member for the W phase of the distribution member.

By hot crimping the base arm 61d and pair of branch arms 61e of the second connection portion 61c, which surround on three sides the terminal portion 72a inserted into the terminal accommodation portion 61f, the conductive wire 75 of the terminal portion 72a and the second connection portion 61c are joined. By this, the bus rings 71U, 71V, and 71W for each phase are connected to the stator coils 44 of the stator pieces 41 for the corresponding phases via the terminals 61. FIG. 18 is a cross-sectional view (cross-sectional view along D-D in FIG. 3) of a connection portion connecting a terminal portion 72a of the U phase bus ring 71U and a second connection portion 61c of a terminal 61. FIG. 19 is a cross-sectional view of the same connection portion in the V phase bus ring 71V, and FIG. 20 is a cross-sectional view of the same connection portion in the W phase bus ring 71W.

The ends 44a of the stator coils 44 of each of the U phase stator pieces 41 are connected to each other via the bus ring 71U; the ends 44a of the stator coils 44 of each of the V phase stator pieces 41 are connected to each other via the bus ring 71V; and the ends 44*a* of the stator coils 44 of each of the W phase stator pieces 41 are connected to each other via the bus ring 71W.

Further, connection terminals 74U, 74V, and 74W protrude in the outward radial direction from the bus rings 71U, 71V, and 71W for each phase. The connection terminals 74U, 74V, and 74W for each phase are connected to feeder lines 91U, 91V, and 91W via busbars 90U, 90V, and 90W placed within the terminal box 14, as shown in FIG. 2 and FIG. 5.

Next, a joining device which is used when joining terminal portions 72*a* to the second connection portion 61*c* of the terminals 61 by hot crimping, as well as the joining procedure, are explained referring to FIG. 21 through FIG. 27. In FIG. 22 through FIG. 27, only the base arm 61*d* and the branch arms 61*e*, which are the principal portions of the second connection portion 61*c* of the terminal 61 during joining, are shown.

Figure 22:
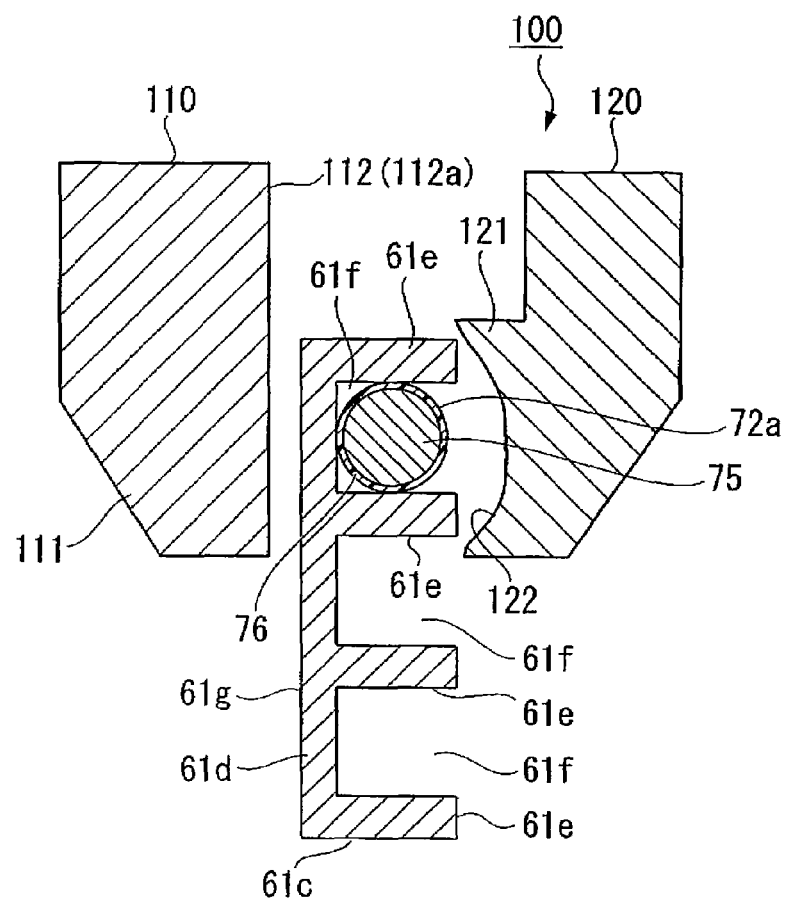
FIG. 22 is a diagram which explains a (first) process of hot crimping by the joining device.

As shown in FIG. 22, a joining device 100 includes a first electrode 110 and a second electrode 120, which encompass on two sides the second connection portion 61*c*, into the terminal accommodation portion 61*f* of which the terminal portion 72*a* of the bus ring 71 has been inserted. The first electrode 110 and the second electrode 120 are both arranged with the length direction substantially parallel to the length direction of the base arm 61*d* of the second connection portion 61*c*. The first electrode 110 and second electrode 120 are both formed with the tip end tapered. The first electrode 110 is positioned opposing the rear face 61*g* of the base arm 61*d* of the second connection portion 61*c* on the side opposite the side on which the branch arms 61*e* are provided. The second electrode 120 is positioned opposing the tips of each of the branch arms 61*e* of the second connection portion 61*c*.

Figure 21:
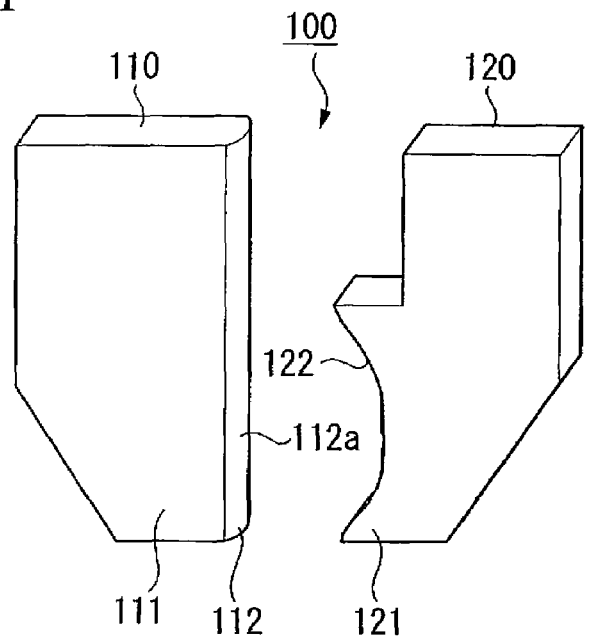
FIG. 21 is an external perspective view of electrodes in a joining device of the present invention.

As seen in the perspective view of FIG. 21, the first electrode 110 has an action portion 111 which acts on the rear face 61*g* of the base arm 61*d*. On the action portion 111 is provided a convex portion 112, expanding outward in an arc shape toward the direction approaching the second electrode 120. The second electrode 120 includes an action portion 121 which protrudes in the direction approaching the first electrode 110. The tip face (an abutting face) 122 of the action portion 121 of the second electrode 120 has dimensions enabling abutment with both tips of a pair of adjacent branch arms 61*e*, and moreover is formed as a concave face which gradually becomes concave in advancing to the center area from both edge portions (that is, the sides which abut the branch arms 61*e*). In other words, in the action portion 121, the abutting face (a tip face 122) which abuts the branch arms 61*e* is formed in a concave shape which gradually becomes concave in the direction of protrusion of the branch arms 61*e*. The surface of the convex portion 112 of the first electrode 110 and the tip face 122 of the second electrode 120 are coated with a titanium coating.

A procedure for joining the terminal portion 72*a* of the bus ring 71 to a second connection portion 61*c* of the terminal 61 using the joining device 100 is explained below.

As shown in FIG. 22, the terminal portion 72*a*, still covered with the insulating film 76, is inserted into the terminal accommodation portion 61*f* of the second connection portion 61*c*, and the first electrode 110 is set opposing the base arm 61*d* positioned at the rear portion of this terminal portion 72*a*; in addition, the second electrode 120 is set opposing the tips of one pair of branch arms 61*e* positioned on both sides of the terminal portion 72*a*. At this time, the apex 112*a* of the convex portion 112 of the first electrode 110 is positioned substantially in the center in the width direction of the base arm 61*d*.

Figure 23:
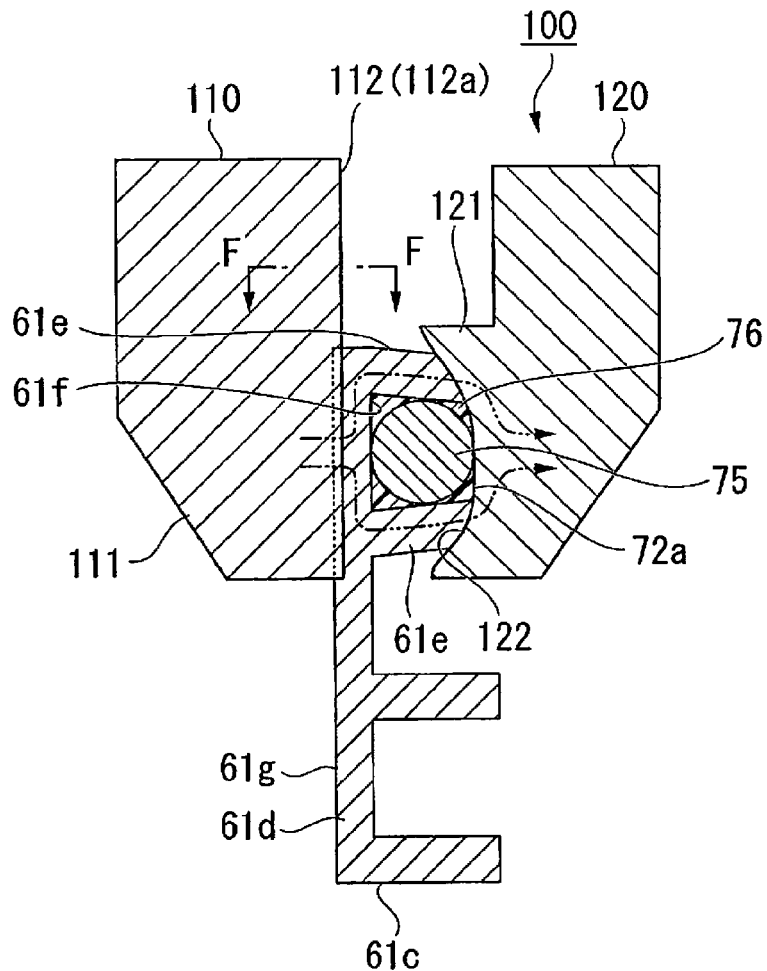
FIG. 23 is a diagram which explains a (second) process of hot crimping by the joining device.
Figure 24:
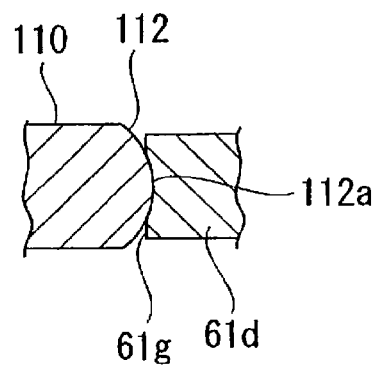
FIG. 24 is a cross-sectional view along F-F in FIG. 23.

Next, the first electrode 110 and the second electrode 120 are made to approach each other, the apex 112*a* of the convex portion 112 of the first electrode 110 is made to abut the rear face 61*g* of the base arm 61*d*, and the tip face 122 of the second electrode 120 is made to abut and apply pressure to both tips of the branch arms 61*e*. By this, as shown in FIG. 23 and FIG. 24, the apex 112*a* of the first electrode 110 is made to encroach substantially into the center of the rear face 61*g* of the base arm 61*d*, the tip portions of both branch arms 61*e* are crushed by the tip face 122 of the action portion 121 of the second electrode 120, and the tip face 122 is pressure-welded with the terminal portion 72*a*. At this time, the tip face 122 of the second electrode 120 is formed into a concave curved surface; therefore, forces act on the tips of both branch arms 61*e* in directions causing mutual approach. And, as a result, the two branch arms 61*e* are also pressure-welded to the terminal portion 72*a*.

In other words, the base arm 61*d* and one pair of branch arms 61*e*, which surround on three sides a terminal portion 72*a* of a bus ring 71, are encompassed between and pressure-welded by the first electrode 110 and second electrode 120.

While maintaining this state in which pressure is applied, a current of predetermined magnitude is passed from the first electrode 110 to the second electrode 120, via the second connection portion 61*c* of the terminal 61. The current at this time flows, as indicated by the two-dots line in FIG. 23, from the action portion 111 of the first electrode 110 through the base arm 61*d* of the second connection portion 61*c*, through the pair of branch arms 61*e* pressure-welded to the terminal portion 72*a*, to the action portion 121 of the second electrode 120. That is, the region in which current flows is limited to only the portions surrounding the terminal portion 72*a* in the second connection portion 61*c*. By this current flow, the base arm 61*d* and the branch arms 61*e* surrounding the terminal portion 72*a* and the second electrode 120 are heated; and by means of this heat, the insulating film 76 of the terminal portion 72*a* is melted and the conductive wire 75 is exposed. The terminal portion 72*a* at this time is surrounded and heated from four directions, so that the insulating film 76 can be melted in a short time. Moreover, the state of applied pressure is maintained, so that the melted insulating film 76 is moved outward, and the base arm 61*d* and the both branch arms 61*e* are pressure-welded to the exposed conductive wire 75. The apex 112 of the first electrode 110 abuts only the center vicinity of the rear face 61*g* of the base arm 61*d*; therefore, heat can be applied from the center of the base arm 61*d*. Consequently, melted insulating film 76 can easily move outward. As a result, foreign matter can be prevented from remaining in the joined portion, and the joining strength can be increased.

Figure 25:
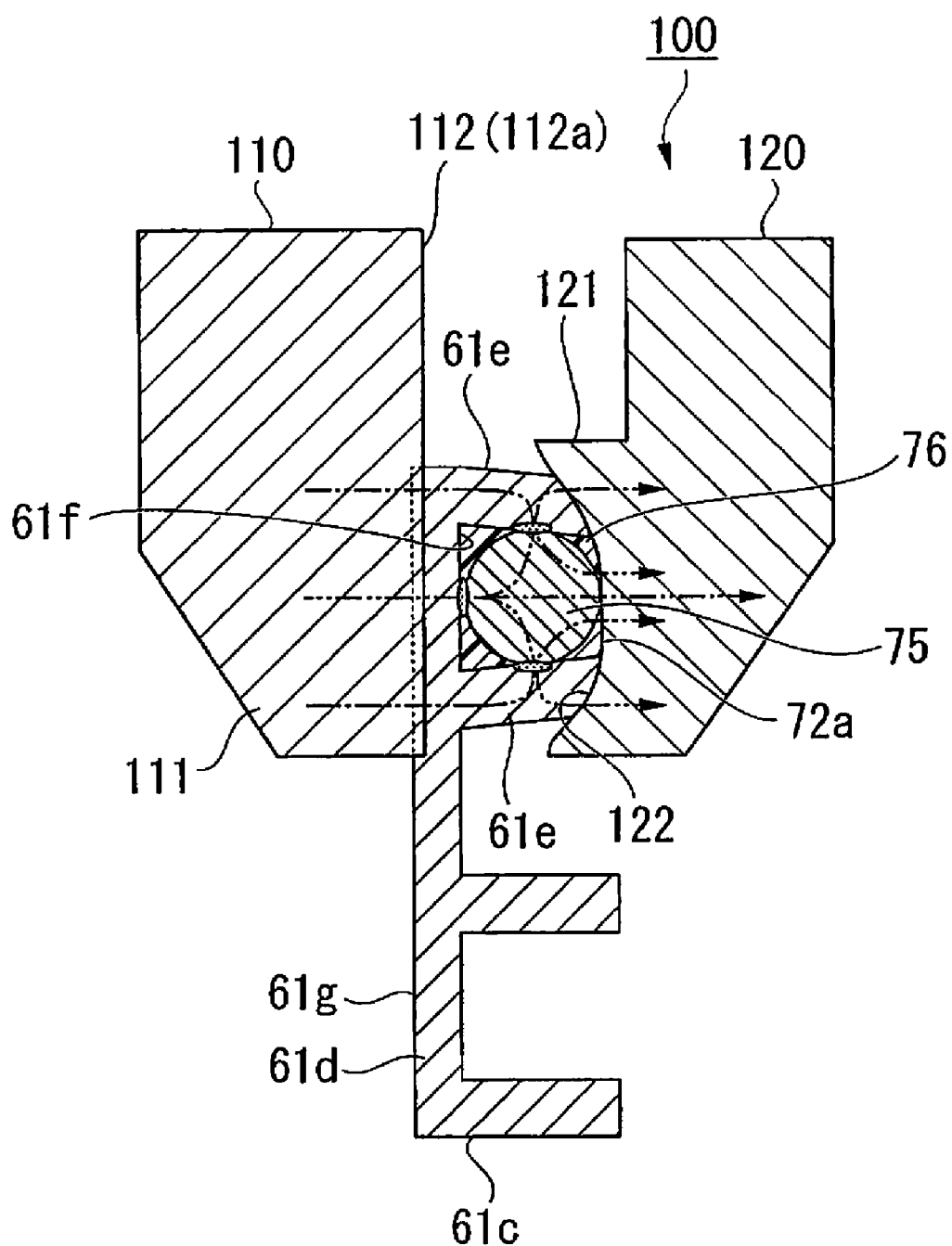
FIG. 25 is a diagram which explains a (third) process of hot crimping by the joining device.

After melting the insulating film 76, a current is then passed from the first electrode 110 to the second electrode 120 via the second connection portion 61*c* and the conductive wire 75. Then, as shown in FIG. 25, the tin plating on the conductive wire 75 diffuses into the contact face between the conductive wire 75 and the base arm 61*d* as well as the contact faces between the conductive wire 75 and the branch arms 61*e*, so that diffusion bonding of these occurs. As a result, the conductive wire 75 of the terminal portion 72*a* in the bus ring 71 is joined at three locations to the base arm 61*d* and the pair of branch arms 61*e* of the second connection portion 61*c*.

Thereafter, the first electrode 110 and second electrode 120 are removed from the second connection portion 61*c* of the terminal 61 and the conductive wire 75 of the terminal portion 72*a*. In this case, because the surface of the convex portion 112 of the first electrode 110 and the tip face 122 of the second electrode 120 are covered with a titanium coating, the first electrode 110 and the second electrode 120 are prevented from readily adhering to the second connection portion 61*c* of the terminal 61 and the conductive wire 75 of the terminal portion 72*a*. In other words, after hot crimping, the first electrode 110 and second electrode 120 can easily be removed from the second connection portion 61*c* and the conductive wire 75.

The above coating may be a coating with a highly heat-resistant conductive material, having a melting point equal to or above the predetermined temperature (for example, 1200° C.), higher than the melting point of the terminal; in the case of a titanium coating, the melting point is 1600° C. By forming a surface roughness equal to or greater than the predetermined value on the electrode surface after coating, the first electrode 110 and second electrode 120 can be made to easily be removed from the second connection portion 61*c* and the conductive wire 75.

As has been explained in the above, according to the joining device 100, the process of stripping the insulating film 76 from the terminal portion 72*a*, and the process of joining the conductive wire 75 of the terminal portion 72*a* with the second connection portion 61*c*, can be performed in a single process. Hence, there is no longer a need to remove the insulating film 76 in advance, and productivity is improved. Moreover, the conductive wire 75 of the terminal portion 72*a* can be joined to three locations, which are the base arm 61*d* and one pair of the branch arms 61*e* in a single process; therefore, productivity is improved.

Further, according to the connection structure of the present embodiment between the terminal portion 72*a* of the bus ring 71 and the second connection portion 61*c* of the terminal 61, the conductive wire 75 of the terminal portion 72*a* is joined to three locations, which are the base arm 61*d* and one pair of the branch arms 61*e*; therefore, tensile strength thereof can be increased. Moreover, electrical resistance in the finished product can be reduced, so that energy losses can be suppressed.

Figure 31:
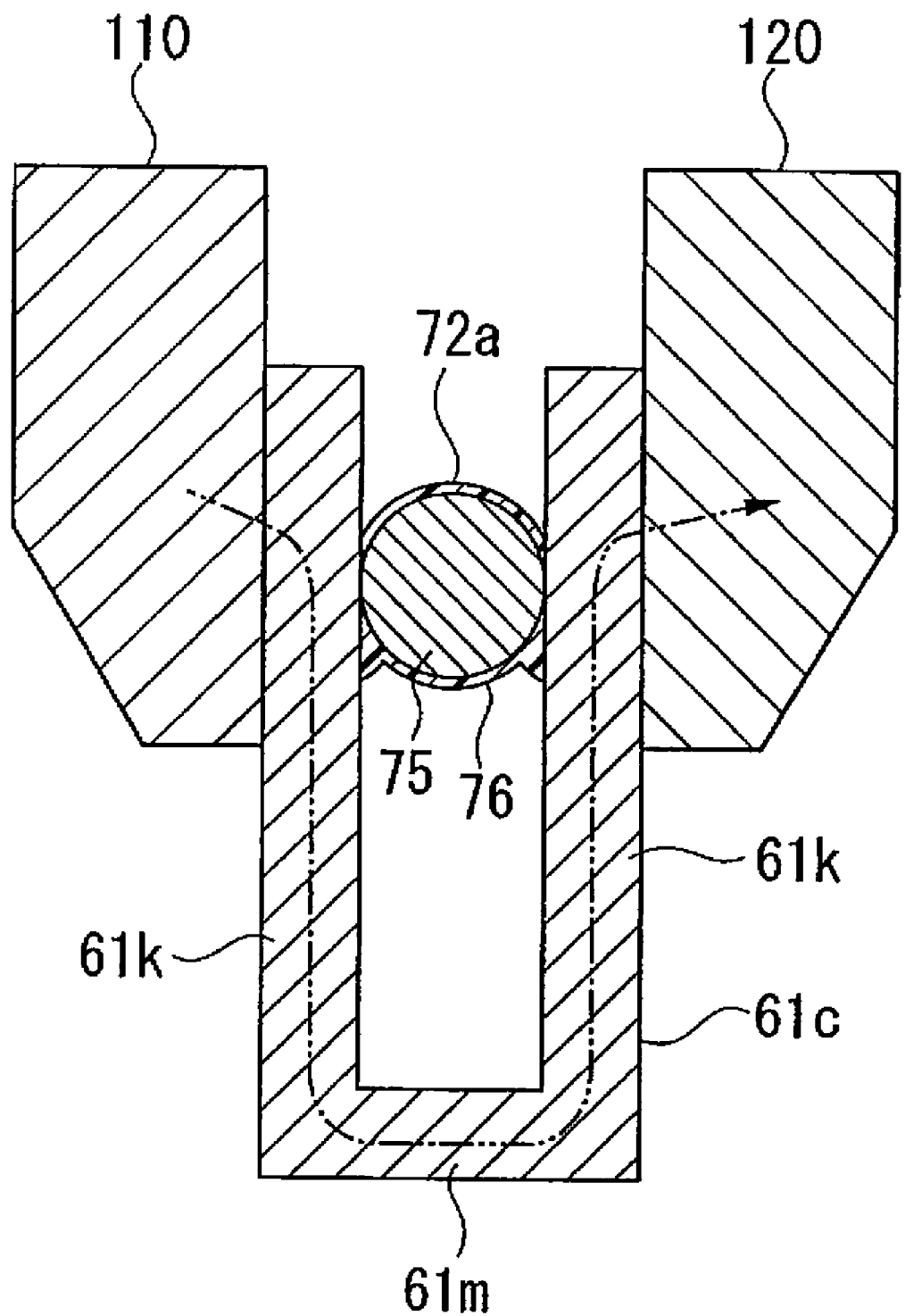
FIG. 31 is a diagram used to explain the hot-crimped state in the terminal of a comparison example.

As a method of employing common components for terminals 61 for each of the phases U, V and W, as shown in FIG. 31, a method is conceivable in which the second connection portion 61*c* of terminals is formed into a long and thin "U" shape, enabling insertion of the terminal portion 72*a* of any of the phases U, V, and W between one pair of mutually opposing parallel arm portions 61*k*. In such a case the terminal portion 72*a* is encompassed between one pair of the parallel arm portions 61*k*, and current is passed to perform hot crimping; however, as indicated by the dot-dash line in FIG. 31, current flows from the first electrode 110 to the second electrode 120 through the second connection portion 61C along the "U" shape until the insulating film 76 of the terminal portion 72*a* melts. When current is thus passed along the entire length of the second connection portion 61*c*, the length of the heated portion becomes longer; therefore, the time for heating is increased, and productivity is deteriorated. Moreover, if the current value is increased in order to enable heating in a short length of time, the return portion 61*m* of the second connection portion 61*c* may explode. When, as in the above-described embodiment, the second connection portion 61*c* includes a base arm 61*d* and the four branch arms 61*e*, such problems can be resolved.

Also, after melting the insulating film 76, the conductive wire 75 is joined to the two parallel arm portions 61*k*; however, because joining is only performed to two locations, the tensile strength is reduced. Further, because there are only two joined locations, the electrical resistance in the finished product becomes higher, and energy losses are greater. When the second connection portion 61*c* includes the base arm 61*d* and the four branch arms 61*e* as in the above-described embodiment, these problems can be resolved.

Figure 26:
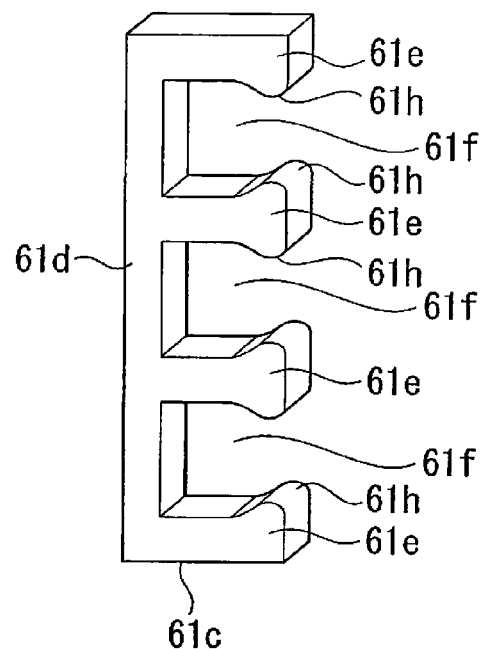
FIG. 26 is a perspective view showing another embodiment of the second connection portion in a terminal.
Figure 27:
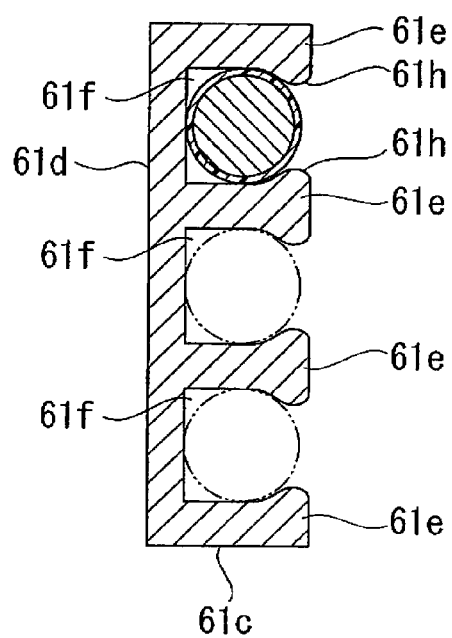
FIG. 27 is a cross-sectional view used to explain the action of the second connection portion.

Another embodiment of the second connection portion 61*c* of the terminal 61 is explained, referring to FIG. 26 and FIG. 27. In the present embodiment, the shape of the tip portion 61*h* of each branch arm 61*e* opposing the adjacent branch arm 61*e* is a shape which follows the external shape of the terminal portion 72*a*. By this, the contact area between the terminal portion 72*a* and the branch arms 61*e* can be increased; therefore, the time until the insulating film 76 is melted can be further shortened. Moreover, the area of the portion which is diffusion-bonded can be increased; therefore, the tensile strength can be further increased.

Figure 28:
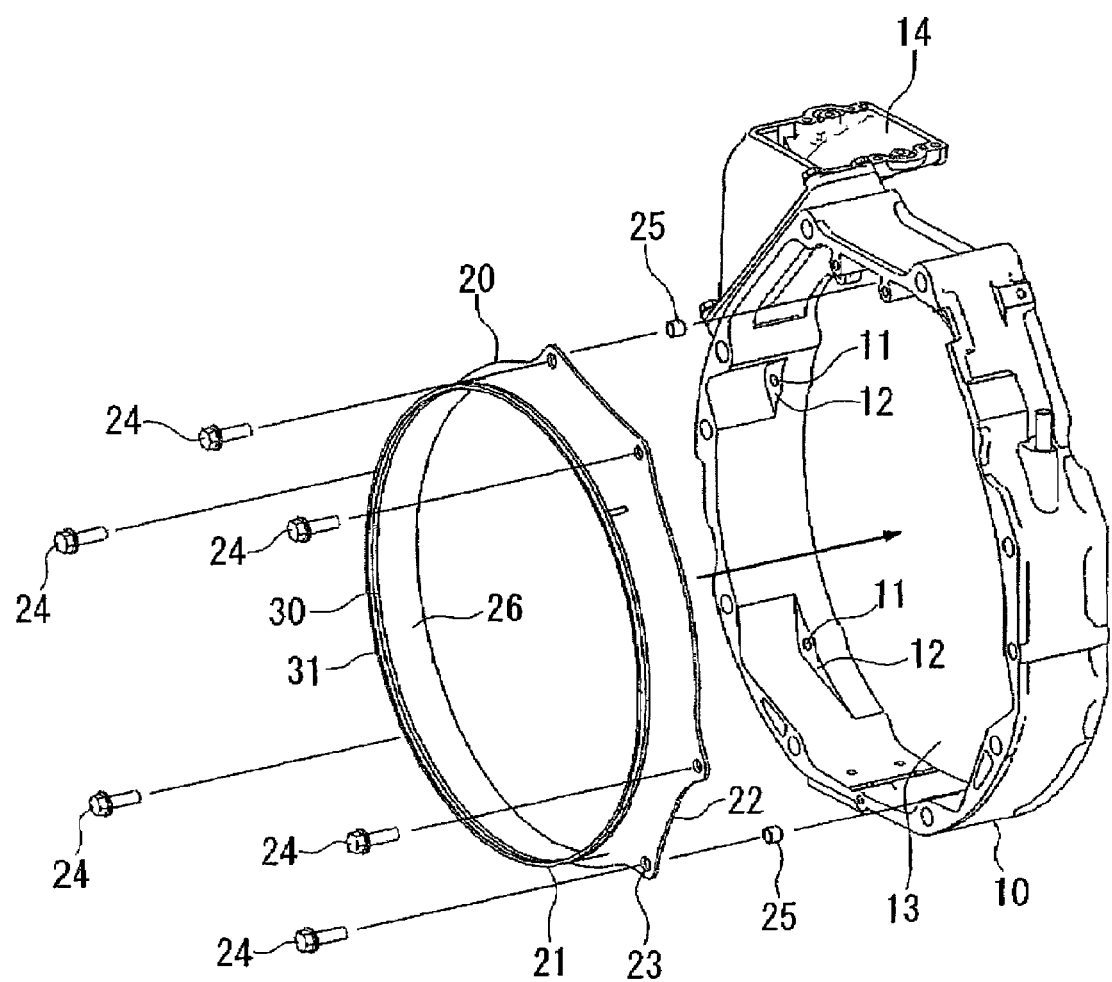
FIG. 28 is a (first) exploded perspective view used to explain a procedure for assembling the stator.
Figure 29:
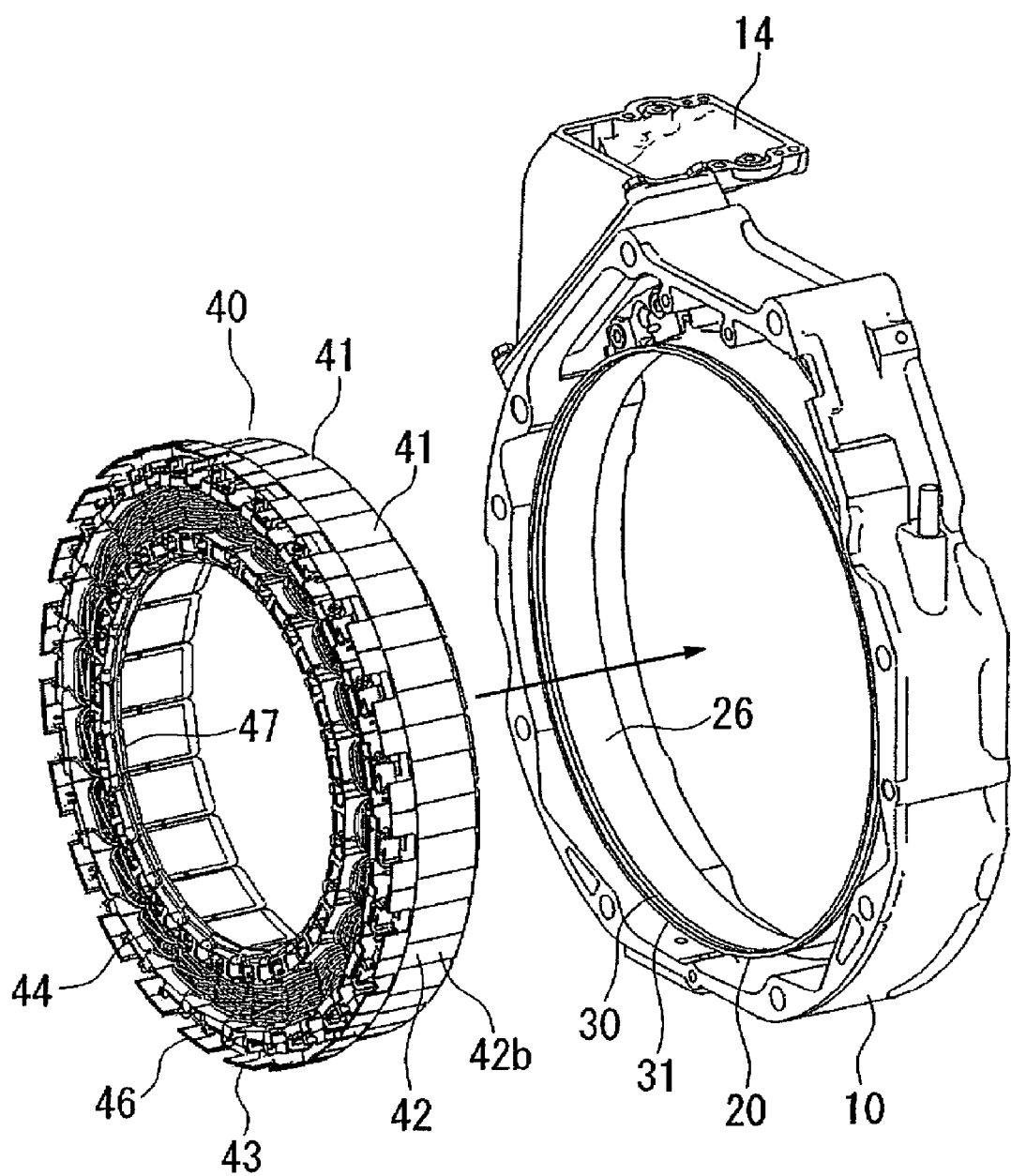
FIG. 29 is a (second) exploded perspective view used to explain the procedure for assembling the stator.
Figure 30:
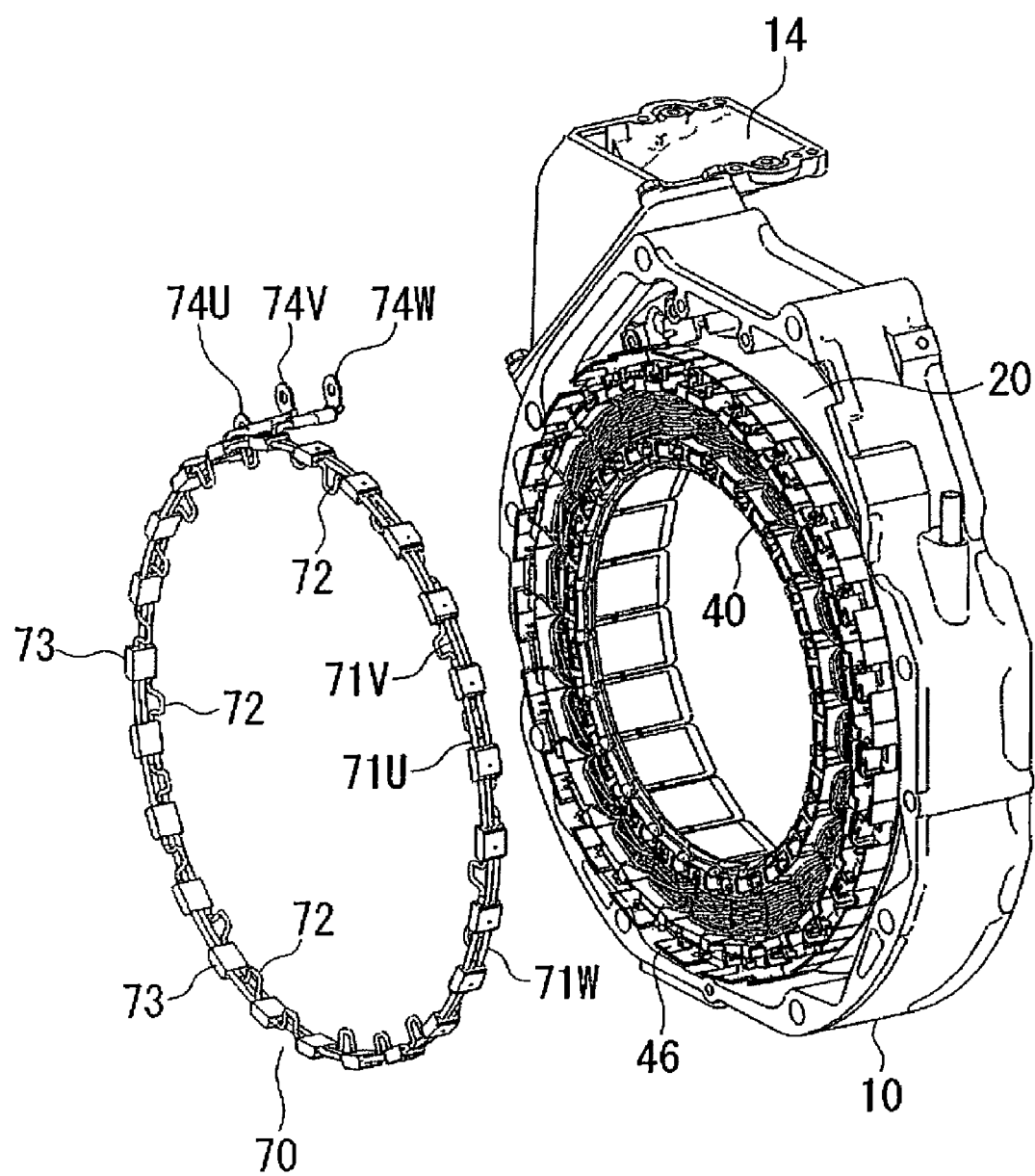
FIG. 30 is a (third) exploded perspective view used to explain the procedure for assembling the stator.

Next, a procedure for assembly of the stator 1 configured in this way is explained, referring to FIG. 28 through FIG. 30.

First, as shown in FIG. 28, the stator holder 20 is mounted on the housing 10. At this time, the flange portion 22 is brought into position first from the opening on the side of the housing 10 on which bosses 12 are not provided, that is, from the opening on the side of the internal combustion engine 2, and the stator holder 20 is inserted into the interior space 13 of the housing 10. Then, while aligning the penetrating holes 23 of the flange portion 22 with the bolt holes 11 of the bosses 12, the flange portion 22 is placed against the end faces of the bosses 12. Two bolts 24 are then passed through the knock pipes 25, and are passed through the corresponding penetrating holes 23 in the flange portion 22, and are screwed into and tightened in the corresponding bolt holes 11, by inserting the knock pipes 25 into knock holes 15. Thus, by installing the two bolts 24, the knock pipes 25 can be installed in predetermined positions. Moreover, the stator holder 20 can be positioned precisely with respect to the housing 10 in both the circumferential direction and in the radial direction. Thereafter, the remaining four bolts 24 are screwed into and tightened in the bolt holes 11, to complete mounting of the stator holder 20.

Next, as shown in FIG. 29, the ring-shaped stator group 40, in which stator pieces 41 have been arranged in advance in a ring shape, is mounted on the stator holder 20. Here, by first bringing into place, through the opening of the guidance portion 31 of the stator holder 20, the side of the ring-shaped stator group 40 not having distribution wall portions 46 and midpoint interconnection wall portions 47 of the insulating bobbins 43, the ring-shaped stator group 40 is inserted. At this time, the inner diameter of the large-diameter cylinder portion 27 of the stator holder 20 is larger than the outer diameter of the yokes 42*b* of the split cores 42 in the ring-shaped stator group 40; therefore, the yokes 42*b* can be smoothly inserted into the large-diameter cylinder portion 27. After inserting the yokes 42*b* into the large-diameter cylinder portion 27, the ring-shaped stator group 40 is pushed further in the axial direction, whereupon the yokes 42*b*, while being guided by the inner face of the guidance portion 31, is guided smoothly to the small-diameter cylinder portion 26 without scratching the inner face of the guidance portion 31. When the ring-shaped stator group 40 is pushed further in the axial direction, the yokes 42*b* are press-fitted into the small-diameter cylinder portion 26. Hence, the ring-shaped stator group 40 can easily be press-fitted into the stator holder 20.

When press-fitting the ring-shaped stator group 40 into the stator holder 20, tips of the press-fitting jig are passed through the holes 46*a* opened in the distribution wall portions 46 of the insulating bobbins 43, and a pressing force is made to act directly on the end faces of the split cores 42. By this, the ring-shaped stator group 40 can be press-fitted into the stator holder 20 without applying force to the resin insulating bobbins 43. As a result, no damage is imparted to the insulating bobbins 43, and breakage of the insulating bobbins 43 can be prevented.

The dimensions for press-fitting of the ring-shaped stator group 40 into the stator holder 20 can be set by adjusting the axial-direction stroke of the press-fitting jig. In this way, the press-fitting dimensions can easily be regulated.

Next, as shown in FIG. 30, the distribution member 70 is positioned on the side plate portions 48 of the insulating bobbins 43 from the side of the ring-shaped stator group 40 having distribution wall portions 46 and the midpoint interconnection wall portion 47 of the insulating bobbins 43. At this time, the terminal portions 72a of the connection portions 72 on the bus rings 71U, 71V, and 71W are shifted and placed at positions adjacent to second connection portions 61c, and then, by moving the bus rings 71U, 71V, and 71W in the circumferential direction, the terminal portions 72a are inserted into the terminal accommodation portions 61f of the second connection portions 61c of terminals 61 in the stator pieces 41 of corresponding phase. Thereafter, by hot crimping the base arm 61d and pair of branch arms 61e of second connection portions 61c, which surround on three sides the terminal portions 72a, the terminal portions 72a are joined with the second connection portions 61c. By this, the terminal portions 72a are securely interconnected with the terminals 61. Moreover, the connection terminals 74U, 74V, and 74W for each phase are connected by bolts 92 to the respective busbars 90U, 90V, and 90W.

When assembly is performed along the above procedure, the housing 10 can be fixed in place, and the stator holder 20, the ring-shaped stator group 40, and the distribution member 70 can be installed in order from the side of the internal combustion engine 2; therefore, assembly proceeds in one direction. Hence, during assembly, there is no need to invert the direction of a member, and productivity is improved.

Further, terminals 61 with the same shape and dimensions can be installed on stator pieces 41 for any phase, so that a single type of terminal 61 is sufficient, common components can be employed, and productivity can be improved.

Other Embodiments

The present invention is not limited to the above-described embodiments.

For example, the distribution member is not limited to a component configured by partially binding together bus rings (feeder lines) using resin mold portions in the circumferential direction; a configuration in which the entirety of the bus rings are encompassed within a resin mold, or distribution members with various other configurations, may be adopted. The terminal portions of the feeder lines are not limited to the above-described "U" shapes, but may be straight rod shapes.

Moreover, the above-described embodiments are examples in which the invention is applied to the stator of an electric motor for driving of a hybrid vehicle; however, applications to the driving electric motors of electric vehicles, and to other electric motors and to the stators of electrical generators, are also possible.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A connection structure of feeder lines and terminals in a stator, in which: a stator coil is wound about an insulating bobbin fitted around a core to configure a stator piece; a plurality of the stator pieces are arranged in a ring shape to configure a ring-shaped stator group; a ring-shaped distribution member is mounted on the ring-shaped stator group; and the feeder lines for each phase of the distribution member and the stator coils are connected via terminals fixed on the insulating bobbins, wherein each of the feeder lines is positioned shifted in the axial direction of the stator for each phase, and includes a terminal portion extending in the radial direction of the stator;

the terminals include a first connection portion, connected to one end of the stator coil, and a second connection portion, connectable to the terminal portions of the feeder lines for any phase;

the second connection portion has a base portion, of length in the axial direction enabling connection to the terminal portion of the feeder lines for any phase, and a plurality of partition walls protruding from the base portion in the circumferential direction of the stator;

the terminal portions of the feeder lines for each phase are joined with one pair of the partition walls, in mutual opposition, and with the base portion; and the terminal portions of the feeder lines for each phase and the second connection portions are formed together as a hot crimped joint.

2. A joining device, in which a stator coil is wound about an insulating bobbin fitted around a core to configure a stator piece; a plurality of the stator pieces are arranged in a ring shape to configure a ring-shaped stator group; a ring-shaped distribution member is mounted on the ring-shaped stator group; the feeder lines for each of the phases of the distribution member and the stator coils are connected via terminals fixed on the insulating bobbins; each of the feeder lines is positioned shifted in the axial direction of the stator for each phase; and includes a terminal portion extending in the radial direction of the stator, the terminals comprise a first connection portion connected to one end of the stator coil and a second connection portion connectable to the terminal portions of the feeder lines for any phase; the second connection portion has a base portion of length in the axial direction enabling connection to the terminal portion of the feeder lines for any phase and a plurality of partition walls protruding from the base portion in the circumferential direction of the stator; and the terminal portions of the feeder lines for each phase join the feeder lines of the stator, joined to one pair of the partition walls in mutual opposition and to the base portion, to the terminals, wherein the joining device comprises:

a first electrode, abutting a rear face of the base portion of the second connection portion on a side opposite side on which the partition walls are provided; and, a second electrode, abutting both tips of the pair of opposing partition walls encompassing the terminal portion of the feeder line, and the abutting face of which is formed into a concave shape which gradually becomes concave in a direction of protrusion of the partition walls, wherein by encompassing the terminal portion of the feeder line, and the base portion and the pair of partition walls, which surround the terminal portion on three sides, with the first electrode and the second electrode, hot crimping is performed, to join the feeder line and the terminal.

3. The joining device according to claim 2, wherein
the first electrode has a convex portion which abuts only a center vicinity of the base portion of the second connection portion.

4. The joining device according to claim 2, wherein
the abutting face of the first electrode and the abutting face of the second electrode are coated with a conductive member having a melting point equal to or above a predetermined temperature.

5. The joining device according to claim 3, wherein
the abutting face of the first electrode and the abutting face of the second electrode are coated with a conductive member having a melting point equal to or above a predetermined temperature.

6. A connection structure of feeder lines and terminals in a stator, in which: a stator coil is wound about an insulating bobbin fitted around a core to configure a stator piece; a plurality of the stator pieces are arranged in a ring shape to configure a ring-shaped stator group; a ring-shaped distribution member is mounted on the ring-shaped stator group; and the feeder lines for each phase of the distribution member and the stator coils are connected via terminals fixed on the insulating bobbins, wherein each of the feeder lines is positioned shifted in the axial direction of the stator for each phase, and includes a terminal portion extending in the radial direction of the stator;

the terminals include a first connection portion, connected to one end of the stator coil, and a second connection portion, having a combtooth shape and connectable to the terminal portions of the feeder lines for any phase;

the second connection portion has a base portion, of length in the axial direction enabling connection to the terminal portion of the feeder lines for any phase, and a plurality of partition walls protruding from the base portion in the circumferential direction of the stator; and the terminal portions of the feeder lines for each phase are joined with one pair of the partition walls, in mutual opposition, and with the base portion.

\* \* \* \* \*